(12) United States Patent
Harada et al.

(10) Patent No.: US 7,513,174 B2
(45) Date of Patent: Apr. 7, 2009

(54) INDUSTRIAL ROBOT

(75) Inventors: Takashi Harada, Akashi (JP); Yuji Maeguchi, Kobe (JP); Takahiro Inada, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 71 days.

(21) Appl. No.: 11/711,027

(22) Filed: Feb. 27, 2007

(65) Prior Publication Data

US 2007/0208458 A1  Sep. 6, 2007

(30) Foreign Application Priority Data

Mar. 1, 2006  (JP)  .............................. 2006-055425

(51) Int. Cl.
  *B25J 17/02* (2006.01)
(52) U.S. Cl. .............. 74/490.06; 74/490.02; 74/490.03; 901/8; 901/15; 901/29
(58) Field of Classification Search ........... 483/16, 483/901; 74/490.01, 490.02, 490.03, 490.05, 74/490.06; 318/568.1, 568.2, 568.21; 414/735, 414/738, 744.3, 744.4, 744.5, 225.01; 901/8, 901/15, 27, 28, 29; 700/245
See application file for complete search history.

(56) References Cited

U.S. PATENT DOCUMENTS

| | | | | |
|---|---|---|---|---|
| 4,260,941 A * | 4/1981 | Engelberger et al. ..... | 318/568.2 |
| 4,627,786 A * | 12/1986 | Minematsu et al. ......... | 414/735 |
| 4,637,774 A * | 1/1987 | Nakamura et al. .......... | 414/735 |
| 4,761,114 A * | 8/1988 | Barland ....................... | 414/735 |
| 4,807,486 A * | 2/1989 | Akeel et al. .............. | 74/490.06 |
| 5,267,483 A * | 12/1993 | Torii et al. ............... | 74/490.01 |
| 5,279,177 A * | 1/1994 | Inada ...................... | 74/490.06 |
| 5,305,653 A * | 4/1994 | Ohtani et al. ............ | 74/490.03 |
| 5,314,293 A * | 5/1994 | Carlisle et al. ........... | 414/744.5 |
| 5,823,061 A * | 10/1998 | Tomiyasu ................. | 74/490.03 |
| 6,494,666 B2 * | 12/2002 | Wu et al. .................. | 414/744.3 |
| 7,168,748 B2 * | 1/2007 | Townsend et al. ............. | 901/38 |

FOREIGN PATENT DOCUMENTS

| JP | A-01-257592 | 10/1989 |
|---|---|---|
| JP | A-08-090463 | 4/1996 |
| JP | A-2004-306072 | 11/2004 |
| JP | A-2005-014103 | 1/2005 |
| JP | A 2005-014103 | 1/2005 |
| JP | A-2006-021299 | 1/2006 |

* cited by examiner

*Primary Examiner*—David P Bryant
*Assistant Examiner*—Eric A. Gates
(74) *Attorney, Agent, or Firm*—Oliff & Berridge, PLC

(57) ABSTRACT

The present invention provides an industrial robot which can reduce torque required for driving an object to be moved. By providing a third reduction device and a third driving device separately, the dimension in the third axial direction of the third reduction device can be reduced, thus the distance from a second axis to an end effecter can be decreased. As such, the torque required for a first driving device and a second driving device to rotate and drive the end effecter can be reduced. Accordingly, even when the weight of the end effecter is increased, an increase of the torque required for the first driving device and the second driving device can be suppressed. Therefore, a higher speed operation can be achieved as compared with the conventional industrial robot.

6 Claims, 14 Drawing Sheets

INDUSTRIAL ROBOT

CROSS REFERENCE TO RELATED APPLICATIONS

This application is based upon the prior Japanese Patent Application No. 2006-55425 filed on Mar. 1, 2006, the entire contents of which are incorporated herein by reference.

BACKGROUND OF THE INVENTION

1. Field of the Invention

The present invention relates to an industrial robot including a guiding mechanism for guiding a cable connected with an end effecter.

2. Description of the Related Art

FIG. 15 is a diagram showing an industrial robot as a related art. This industrial robot includes a wrist mechanism having three joint portions 11, 12, 13. Each of the joint portions 11, 12, 13 is constructed by using a reduction device-integrated type motor into which a reduction mechanism is integrally incorporated.

The first joint portion 11 is provided at an arm 8 and is configured to rotate a first rotating portion 1 about a first axis L11. The second joint portion 12 is provided at a first fixed portion 2 fixed to the first rotating portion 1 and is configured to rotate a second rotating portion 3 about a second axis L12 relative to the first fixed portion 2. The third joint portion 13 is provided at a second fixed portion 4 fixed to the second rotating portion 3 and is configured to rotate a third rotating portion 5 about a third axis L13 relative to the second fixed portion 4. An end effecter is fixed to the third rotating portion 5.

The second axis L12 extends perpendicularly to the first axis L11. The third axis L13 extends perpendicularly to the second axis L12. When the first to third joint portions 11 to 13 rotate the corresponding rotating portions 1, 3, 5 by predetermined rotational amounts respectively, the end effecter can be moved to any given position within a movable range relative to the arm 8.

Each of the first joint portion 11 and third joint portion 13 is formed into a hollow shape. The second joint portion 12 is located at a position apart from the first axis L11. In such a configuration, a cable extending through the arm 8 up to the end effecter will be inserted through the first joint portion 11 and third joint portion 13 while bypassing the second joint portion 12. Thus, extension of the cable around the outer periphery of the wrist mechanism can be prevented. This type of industrial robot is disclosed in JP 2005-14103 A.

If the third joint portion 13 is positioned unduly close to the second axis L12, the curved cable will interfere with the third joint portion 13 upon rotating the third joint portion 13 about the second axis L12. Accordingly, in order to prevent such interference between the cable and the third joint portion 13, the third joint portion 13 should be spaced away from the second axis L12 along the axial direction of the third axis L13. In such a related art described above, since the third joint portion 13 is constructed by using a reduction device-integrated type motor, it should be larger in size in the third axial direction by the motor provided thereto, as compared with the case using the reduction device alone. Therefore, in the related art, the third joint portion 13 should be spaced away a significantly greater distance from the second axis L12.

When the distance that the third joint portion 13 is spaced away from the second axis L12 is increased, the distance from the second axis L12 to the end effecter is also increased. In such a case, the torque required for rotating and driving an end effecter by using the first joint portion 11 and second joint portion 12 should be increased. This is problematic. Also, in such a case, if the weight of the end effecter is significantly large, high speed driving of the end effecter will be difficult, or otherwise downsizing of the first joint portion 11 and/or second joint portion 12 may tend to be difficult. Similar problems may also occur in the case where an object to be moved other than the end effecter is fixed to the third rotating portion 5 of the third joint portion 13.

SUMMARY OF THE INVENTION

It is therefore an object of the present invention to provide an industrial robot which is able to reduce the torque required for moving an object to be moved.

The present invention is an industrial robot, comprising:

(a) a base portion at which a predetermined first axis is set and in which an internal space is formed so that a cable can be inserted into the internal space;

(b) a first reduction device having a hollow structure and mounted on the base portion, the first reduction device including a first input axis part and a first output axis part so that a rotation applied to the input axis part is reduced and transmitted to the output axis part, the first output axis part being configured to be rotatable about the first axis, and a first through hole is formed in the first reduction device so as to extend coaxially with the first axis and communicate with the internal space of the base portion;

(c) a first driving device mounted on the base portion and adapted to apply a rotation to the first input axis part of the first reduction device;

(d) a first movable portion fixed to the first output axis part of the first reduction device, a second axis being set at the first movable portion such that the second axis extends vertically to the first axis in a position spaced away from the base portion in the first axial direction, the first movable portion forming a first movable portion space to extend back along the first axial direction, pass through the second axis, and communicate with the first through hole;

(e) a second reduction device mounted on the first movable portion, the second reduction device including a second input axis part and a second output axis part so that a rotation applied to the second input axis part is reduced and transmitted to the second output axis part, the second output axis part being located in a position spaced away from the first axis in the second axial direction and configured to be rotatable about the second axis;

(f) a second driving device mounted on the first movable portion and adapted to apply a rotation to the second input axis part of the second reduction device;

(g) a second movable portion fixed to the second output axis part of the second reduction device, a third axis being set so as to pass through a position nearer to the first axis than the second output axis part of the second reduction device in the second axial direction and extend vertically to the second axis, the second movable portion forming a second movable portion space to communicate with the first movable portion space passing through the second axis and extend along the third axial direction;

(h) a third reduction device having a hollow structure and mounted on the second movable portion, the third reduction device including a third input axis part and a third output axis part so that a rotation applied to the third input axis part is reduced and transmitted to the third output axis part, the third output axis part being configured to be rotatable about the third axis, a third through hole being formed in the third reduction device so as to extend coaxially with the third axis and communicate with the second movable portion space;

(i) a third movable portion fixed to the third output axis part of the third reduction device, the third movable portion being configured such that an end effecter can be attached thereto, the third movable portion forming a third movable portion space to extend coaxially with the third axis and communicate with an external space from the third through hole; and (j) a third driving device mounted on the second movable portion and adapted to apply a rotation to the third input axis part of the third reduction device, the third driving device being located opposite to the third reduction device relative to the second movable portion with respect to the third axial direction and disposed to be spaced away from the third axis in the direction vertical to the third axis.

According to the present invention, the first driving device applies a rotation to the first input axis part of the first reduction device, thus the first output axis part of the first reduction device is rotated about the first axis. At this time, the first movable portion fixed to the first output axis part is also rotated about the first axis relative to the base portion. Additionally, the second driving device applies a rotation to the second input axis part of the second reduction device, thus the second output axis part of the second reduction device is rotated about the second axis. At this time, the second movable portion fixed to the second output axis part is also rotated about the second axis relative to the first movable portion. Furthermore, the third driving device applies a rotation to the third input axis part of the third reduction device, thus the third output axis part of the third reduction device is rotated about the third axis. At this time, the third movable portion and an end effecter both fixed to the third output axis part are also rotated about the third axis relative to the second movable portion. Accordingly, by rotating the first to third movable portions in given rotational amounts by actuating the first to third driving devices, respectively, the end effecter can be moved to any desired positions within a movable range. By transmitting power of each driving device to each corresponding movable portion via each reduction device, the torque to be applied to each movable portion can be increased.

The internal space of the base portion is in communication with the first movable portion space of the first movable portion via the first through hole of the first reduction device. Since the first through hole extends coaxially with the first axis, even when the first movable portion is rotated about the first axis relative to the base portion, the communication between the internal space and the first movable portion space can be maintained. Similarly, the second movable portion space of the second movable portion is in communication with an external space of the third output axis part of the third reduction device via the third through hole of the third reduction device. Since the third through hole extends coaxially with the third axis, even when the third movable portion is rotated about the third axis relative to the second movable portion, the communication between the second movable portion space and the external space of the third output axis part can be maintained. In addition, the first movable portion space is in communication with the second movable portion space in the vicinity of the second axis. Since the second movable portion is rotated about the second axis, even when the second movable portion is rotated, the communication between the second movable portion space and a region of the first movable portion space passing through the second axis can be maintained.

Accordingly, due to the internal space of the base portion, first through hole, first movable portion space, second movable portion space, third through hole and third movable portion space, a single cable insertion passage is formed. The cable insertion passage can maintain a communication state defined therethrough even when the first movable portion, second movable portion and third movable portion are rotated. Accordingly, by inserting the cable through the cable insertion passage and having it extend from the internal space of the base portion up to the external space of the third movable portion, deformation of the cable inserted through the cable insertion passage can be significantly reduced even when the industrial robot is changed in form due to displacement of the respective movable portions.

In the present invention, the third reduction device and the third driving device are provided separately. Due to this construction, the dimension in the third axial direction of the third reduction device can be reduced as compared with the construction wherein the third reduction device and the third driving device is integrally formed. Thus, interference between the third reduction device and the cable can be prevented, thereby reducing the distance between the third reduction device and the second axis. Accordingly, the distance between the second axis and the end effecter can be decreased, as such the torque required for the first driving device and the second driving device to rotate and drive the end effecter can be reduced. Due to the arrangement of the third driving device opposite to the third reduction device with respect to the third axial direction relative to the second movable portion, projection of the third driving device from the third reduction device in the third axial direction can be prevented, thus preventing interference of the third driving device with fixation of the end effecter to the third output axis part of the third reduction device. Since the third driving device is located at a position apart from the third axis in the direction vertical to the third axis, even when the third driving device is arranged opposite to the third reduction device with respect to the third axial direction relative to the second movable portion, interference between the third driving device and the cable can be prevented.

Preferably, in the present invention, the first axis, second axis and third axis cross one another at a point.

According to this invention, there is a reference state in which the first axis and the third axis are arranged coaxially. When the first movable portion is rotated about the first axis from the reference state, or when the third movable portion is rotated about the third axis from the reference state, the length of the cable insertion passage is kept substantially constant. When the second movable portion is rotated within a given rotational range about the second axis from the reference state, the cable insertion passage advances linearly from the internal space of the base portion up to the intersection point of the first to third axes, then turns at the intersection point and advances linearly from the intersection point up to the external space of the third movable portion. As such, the length of the cable insertion passage is kept substantially constant.

Accordingly, when the cable is inserted through the cable insertion passage, only a negligible bending or twist will occur in the cable. Thus, pulling force and axial compressive force, the so-called buckling force, to be applied to the cable can be reduced. In addition, the route of the cable can be significantly reduced.

Preferably, in the prevent invention, the third driving device is arranged to be spaced away from the third axis in the second axial direction.

According to this invention, since the third driving device is fixed to the second movable portion, it is rotated together with the second movable portion about the second axis. In this case, since the third driving device is spaced away from the third axis in the second axial direction, even when the second movable portion is rotates about the second axis, crossing of the third driving device relative to the third axis can be prevented. Consequently, even when the cable is inserted through the second movable portion space, interference between the cable and the third driving device can be prevented more securely.

Preferably, in the present invention, the second reduction device and the third driving device are arranged side by side across the third axis along the second axial direction.

According to this invention, the second movable portion is connected with the second reduction device at its one end along the second axial direction and connected with the third driving device at the other end along the second axial direction. Thus, lack of balance of the center of gravity of the industrial robot can be prevented, and undesirable increase of the torque output required for the first driving device and the second driving device can be prevented as compared with a case where the center of gravity is significantly unbalanced.

Preferably, in the present invention, the second driving device is arranged nearer to the base portion than the second reduction device so as to apply a rotation to the second input axis part of the second reduction device through a power transmission mechanism adapted to transmit a power. The second driving device extends in parallel with the second axis and is disposed to be spaced away from the first axis in the second axial direction According to this invention, the second driving device adapted to apply a rotation to the second input axis part can be arranged as near as possible relative to the base portion. Thus, interference, with the second driving device, of the third driving device which is arranged at the end effecter side can be prevented. In addition, by arranging the second driving device to be spaced away from the first axis along the second axial direction, interference of the second driving device with the cable can be prevented. Due to the prevention of interference with the cable, the second driving device can be arranged to cross a position in the vicinity of the first axis. Therefore, even though the second driving device is arranged in parallel with the second axis, projection of the second driving device from the second movable portion in the second axial direction can be prevented.

Preferably, the second driving device extends in parallel with the first axis and is disposed to be farther from the first axis in a direction vertical to the first axis than the first movable portion.

Preferably, in the present invention, the second movable portion has one end in the second axial direction and the other end in the second axial direction both of which are supported by the first movable portion.

According to this invention, the rigidity of the industrial robot can be enhanced as compared with the case where the second movable portion is supported by the first movable portion in a cantilevered fashion. As such, bending and vibration of the end effecter can be prevented, thus enhancing precision in positioning.

Preferably, in the present invention, the base portion is configured to be movable to given three dimensional positions.

According to this invention, an articulated six-axle robot can be actualized. Among these axes, the terminal three axes provided nearer to the end effecter correspond to the aforementioned first to three axes, respectively. Accordingly, within a predetermined movable range, the end effecter can be located in any desired position and posture. Since the cable to be connected with the end effecter can be incorporated into the terminal portion of the robot, the cable can be protected in the wrist end portion.

According to the present invention mentioned above, the internal space of the base portion, first through hole, first movable portion space, second movable portion space, third through hole and third movable portion space can form a single cable insertion passage. By inserting the cable through the cable insertion passage, it can be prevented that the cable is pulled and compressed in a greater amount when the respective movable portions are operated, thus reducing the load to be imposed on the cable and lengthening the life of the cable.

By providing the third reduction device and the third driving device separately, the dimension of the third reduction device in the third axial direction can be reduced, so that the distance between the second axis and the end effecter can be decreased. As such, the torque required for the first driving device and the second driving device to rotate and drive the end effecter can be reduced. Consequently, even when the weight of the end effecter is increased, increase of the torque required for the first driving device and the second machine can be suppressed. Therefore, a higher speed operation can be achieved as compared with the conventional industrial robot.

By arranging the third driving device opposite to the third reduction device along the third axial direction relative to the second movable portion, projection of the third driving device from the third reduction device can be prevented, thus preventing the tendency to form the industrial robot into a larger size. Additionally, by arranging the third driving device in a position apart from the third axis in the direction vertical to the third axis, even when the third driving device and the third reduction device are provided separately, interference between the third driving device and the cable can be prevented, as such preventing damage of the cable.

Preferably, due to the feature that the first axis, second axis and third axis cross at a point, the influence to be experienced by rotating the respective first to third movable portions can be reduced. Specifically, as compared with the case where the cable is arranged around the outer periphery of the robot, occurrence of greater pulling force, buckling force and axial compressive force to the cable can be reduced or eliminated, thus lengthening the life of the cable. In addition, the length of the cable can be decreased as much as possible, thereby reducing the production cost.

Preferably, due to the feature that the third driving device is arranged to be spaced away from the third axis along the second axial direction, interference between the third driving device and the cable can be prevented more securely, the life of the cable can be further lengthened. Since it is not necessary to expect and consider the interference with the cable, the degree of freedom in designing the third driving device can be improved.

Preferably, the second movable portion is connected with the second reduction device at its one end along the second axial direction, and is connected with the third driving device at the other end along the second axial direction. Thus, lack of balance of the center of gravity of the industrial robot can be prevented, and undesirable increase of the torque required for the first driving device and the second driving device can be prevented as compared with a case where the center of gravity is significantly unbalanced.

Preferably, the second driving device adapted to apply a rotation to the second input axis part can be arranged as near as possible relative to the base portion. As such, interference between the third driving device arranged at the end effecter side and the second driving device can be prevented, thus the degree of freedom in selecting the second driving device and the third driving device can be increased. Due to the feature that the second driving device is arranged to be spaced away from the first axis in the second axial direction, interference with the cable can be prevented, as well as, the second driving device can be arranged to cross a portion in the vicinity of the first axis, thus projection of the second driving device from the second movable portion in the second axial direction can be prevented.

Preferably, the rigidity of the industrial robot can be enhanced as compared with the case where the second movable portion is supported by the first movable portion in a cantilevered fashion. As such, bending and vibration of the end effecter can be prevented, thus enhancing precision in positioning.

Preferably, an articulated six-axle robot can be provided. Among these axes, the three axes provided nearer to the end effecter correspond to the aforementioned first to three axes, respectively. Accordingly, within a predetermined movable range, the end effecter can be located in any desired position and posture. Since the cable to be connected with the end effecter can be incorporated into the terminal portion of the robot, the cable can be protected in the terminal end portion.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
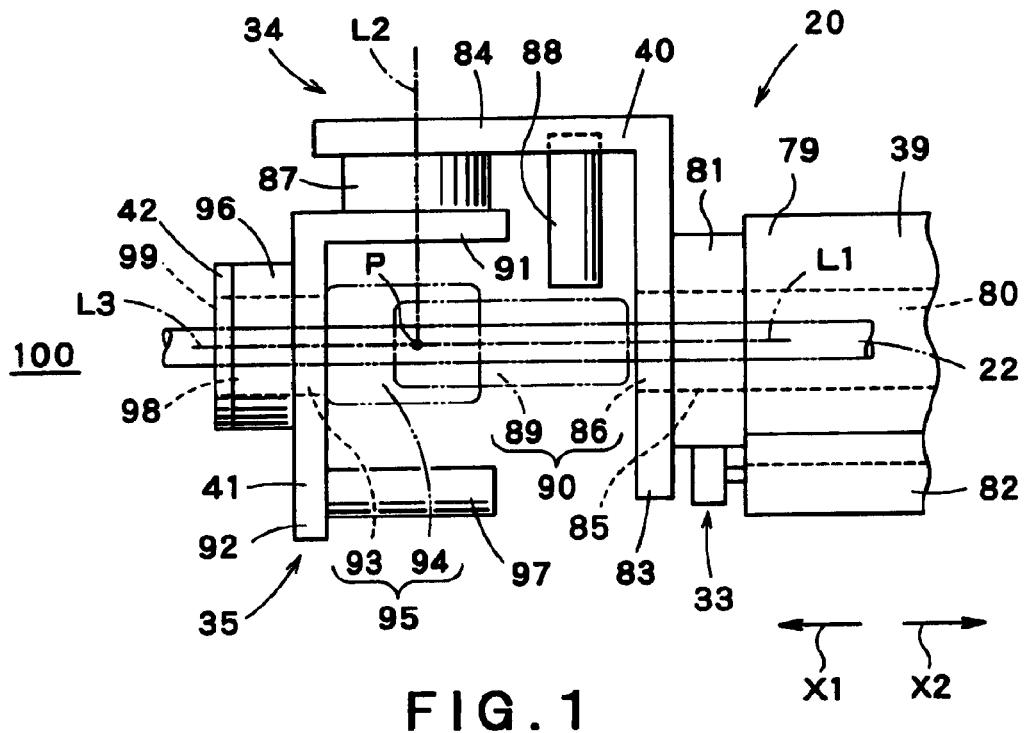
FIG. 1 is a front view schematically illustrating a portion of an industrial robot 20 of a first embodiment of the present invention.
Figure 2:
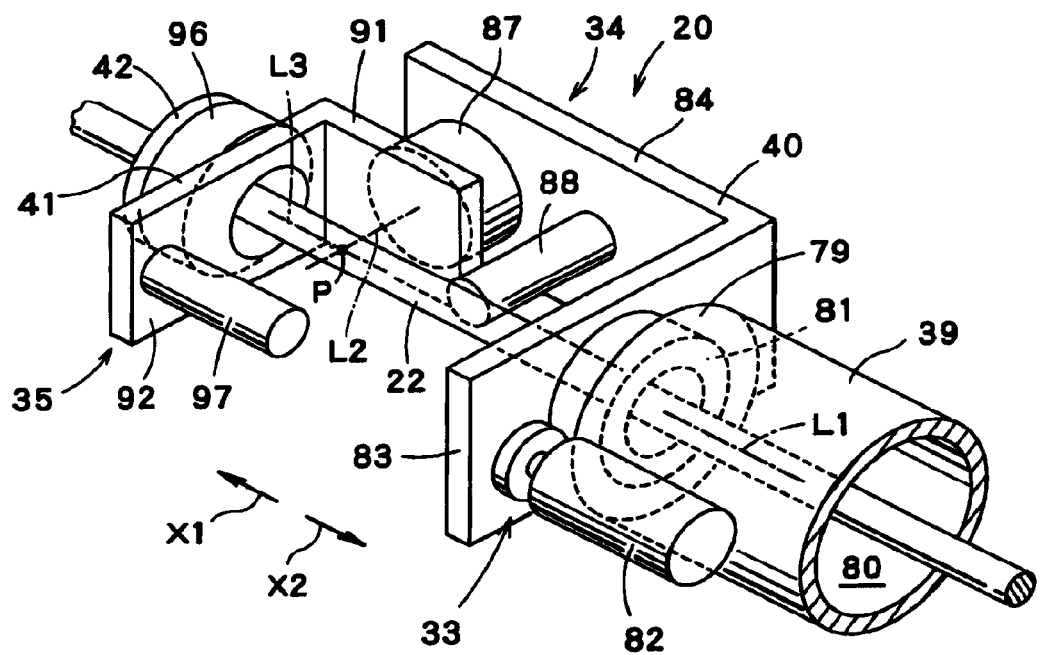
FIG. 2 is a perspective view of a portion of the industrial robot 20 shown in FIG. 1.
Figure 3:
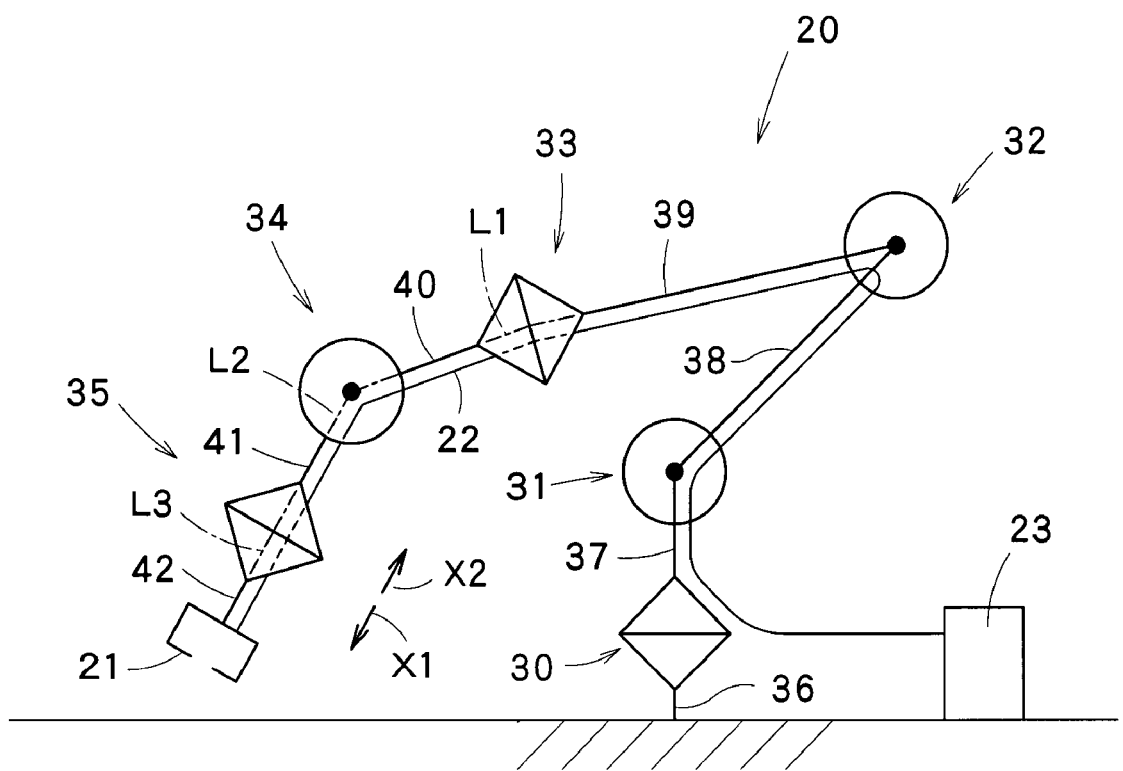
FIG. 3 is a simplified view of the industrial robot 20.

Referring to FIGS. 1 to 3, an industrial robot 20 of a first embodiment of the present invention will be described hereunder.

As shown in FIG. 3, the industrial robot 20 of the first embodiment is a vertical-type articulated six-axle robot for spot welding. In the industrial robot 20, a plurality of movable portions are rotatably connected with one another, and a welding gun 21 is provided at its distal end. The industrial robot 20 performs spot welding at predetermined welding positions by driving each movable portion relative to one another to move the welding gun 21 to the targeted welding positions. The welding gun 21 serves as an end effecter to be provided at a distal end of the robot. To the welding gun 21 one end of a cable 22 is connected. The other end of the cable 22 is connected with a supplying source 23 provided at a position spaced away from the robot.

In this embodiment, the supplying source 23 includes one or more of a power source for supplying electric current used for welding to the welding gun 21, a power source for supplying electric power for driving the welding gun 21, a robot controller adapted to provide an operating signal for the welding gun 21, a cooling water supplying pump for supplying cooling water used for cooling the welding gun 21, and the like. Accordingly, the cable 22 comprises a bundle of wirings and pipes for supplying electric power, signals, electric current, gases, liquids and the like from the supplying source to the welding gun 21.

The industrial robot 20 includes three joint portions 30, 31, 32 for mainly determining the three dimensional position of the welding gun 21, and other three joint portions 33, 34, 35 for mainly determining the posture of the welding gun 21. Additionally, the robot 20 includes a plurality of movable portions or arms 37 to 42 respectively connected via the joint portions 30 to 35.

Specifically, the industrial robot 20 comprises a base 36, the arm first joint portion 30, first arm 37, arm second joint portion 31, second arm 38, arm third joint portion 32 and third arm 39. The base 36 is fixed to a predetermined fixing position. The first arm 37 is connected to the base 36 via the arm first joint portion 30. The second arm 38 is connected to the first arm 37 via the arm second joint portion 31. Similarly, the third arm 39 is connected to the second arm 38 via the arm third joint portion 32.

The arm first joint portion 30 connects the first arm 37 such that it can rotate about an arm first axis. The arm first axis is set at the base 36, in advance, for example, to extend vertically. The arm second joint portion 31 connects the second arm 38 such that it can rotate about an arm second axis. The arm second axis is set at the first arm 37.

The arm second axis crosses the arm first axis, and extends perpendicularly to the arm first axis. The arm third joint portion 32 connects the third arm 39 such that it can rotate about an arm third axis. The arm third axis is set at the second arm 38, and extends in parallel to the arm second axis. In this embodiment, the third arm 39 is sometimes referred to as a wrist base portion 39.

The industrial robot 20 also includes the wrist first joint portion 33, first wrist movable portion 40, wrist second joint portion 34, second wrist movable portion 41, wrist third joint portion 35 and third wrist movable portion 42.

The first wrist movable portion 40 is connected to the wrist base portion 39 via the wrist first joint portion 33. The second wrist movable portion 41 is connected to the first wrist movable portion 40 via the wrist second joint portion 34. Similarly, the third wrist movable portion 42 is connected to the second movable portion 41 via the third joint portion 35.

The wrist first joint portion 33 connects the first wrist movable portion 40 such that it can rotate about a wrist first axis L1. The wrist first axis L1 is set at the wrist base portion 39, and extends coaxially with the wrist base portion 39 and perpendicularly to the arm third axis. Accordingly, the wrist first axis L1 is displaced together with displacement of the wrist base portion 39.

The wrist second joint portion 34 connects the second wrist movable portion 41 such that it can rotate about a wrist second axis L2. The wrist second axis L2 is set at the first wrist movable portion 40. The wrist second axis L2 crosses the wrist first axis L1, and extends perpendicularly to the wrist first axis L1. Accordingly, the wrist second axis L2 is displaced together with displacement of the first wrist movable portion 40.

The wrist third joint portion 35 connects the third wrist movable portion 42 such that it can rotate about a wrist third axis L3. The wrist third axis L3 is set at the second wrist movable portion 41, and extends perpendicularly to the wrist second axis L2. Accordingly, the wrist third axis L3 is displaced together with displacement of the second wrist movable portion 41. The wrist first axis L1, wrist second axis L2 and wrist third axis L3 cross one another at a point. At the third wrist movable portion 42, the welding gun 21 is installed as an end effecter.

Each of the arms 37 to 39 and wrist movable portions 40 to 42 described above serves as a movable portion for the robot, and is rotated about each corresponding axis by a motor. In this way, the welding gun 21 which is installed at the third wrist movable portion 42 can be arranged in any desired position and posture. It is noted that the rotation described herein may include angular displacement less than 360°. Further, it is noted that the direction in which one goes toward the welding gun 21 along the movable portions is sometimes referred to as a distal direction X1, while the direction in which one goes toward the base 36 along the movable portions is sometimes referred to as a proximal direction X2.

The cable 22 connecting the welding gun 21 with the supplying source 23 extends along at least the base 39 and respective wrist movable portions 40 to 42. The industrial robot 20 also includes a cable guide mechanism for guiding the cable 22. The guide mechanism serves to maintain the cable 22 arranged along the respective wrist movable portions 40 to 42 even in the case where those wrist movable portions 40 to 42 are displaced, respectively.

Now, the wrist mechanism which is one of important features of this invention will be described below. Hereinafter, the wrist first joint portion 33 to wrist third joint portion 35 will be merely referred to as the first joint portion 33 to third joint portion 35, respectively. Similarly, the first wrist movable portion 40 to third wrist movable portion 42 will be merely referred to as the first movable portion 40 to third movable portion 42, respectively. Also, the wrist base portion 39 will be merely referred to as the base portion 39, and the wrist first axis L1 to wrist third axis L3 referred to as the first axis L1 to third axis L3, respectively. In addition, the direction in which one goes in parallel to each axis will be referred to as the axial direction. For example, the direction in which a member extends in parallel to the wrist first axis will be referred to as the first axial direction, the direction in which one extends in parallel to the wrist second axis will be referred to as the second axial direction, and the direction in which one extends in parallel to the wrist third axis will be referred to as the third axial direction.

The base portion 39 has a contour formed into a generally cylindrical shape, and extends coaxially with the first axis L1. In the base portion 39, an internal space 80 is formed such that the cable 22 can be inserted therethrough in the axial direction. The base portion 39 has an opening formed at one end 79 in the axial direction, i.e., the distal direction X1, in communication with the internal space 80.

The first joint portion 33 is configured to include a first reduction device 81 having a hollow structure and a first driving device 82. The first reduction device 81 is formed into an annular body, and is provided in the base portion 39 coaxially with the first axis L1. The first reduction device 81 includes a first input axis part, a first output axis part, and a first housing. The first housing is fixed to one end 79 in the axial direction of the base portion 39. The first reduction device 81 is adapted to reduce the rotation to be applied to the first input axis part and then transmit it to the first output axis part. The first reduction device 81 includes a first through hole 85 which extends coaxially with the first axis L1 and communicates with the internal space 80 of the base portion 39. The first output axis part is configured to be rotatable about the first axis L1 relative to the base portion 39.

The first driving device 82 is provided in the base portion 39, and is adapted to provide rotation to the first input axis part of the first reduction device 81. For example, the first reduction device 81 can be achieved by a Cyclo-Reduction device having a hollow structure. The first driving device 82 can be provided by employing a servomotor.

The first movable portion 40 is fixed to the first output axis part of the first reduction device 81, and is configured to be rotatable about the first axis L1 relative to the base portion 39. In this embodiment, the first movable portion 40 is formed into a generally L-shaped body. The first movable portion 40 include a first fixed portion 83 fixed to the first output axis part of the first reduction device 81 and a first support portion 84 which bends from the first fixed portion 83 and at which the second axis L2 is set. The first fixed portion 83 is fixed to an end face of the first output axis part of the first reduction device 81, and extends along the second axial direction from the first output axis part. The second axial direction is vertical to the first axis L1. In the first fixed portion 83, a first movable portion through hole 86 is formed such that it extends through the first fixed portion 83 in communication with the first through hole 85 of the first reduction device 81 and coaxially with the first axis L1.

The first support portion 84 is connected with one end of the first fixed portion 83 opposed to the first driving device with respect to the second axial direction, and extends along the first axial direction. As such, the first support portion 84 is spaced away from the first axis L1 in the second axial direction, and extends from the first fixed portion 83 along the first axial direction. At the first support portion 84, the aforementioned second axis L2 is set. The second axis L2 extends perpendicularly to the first axis L1, and passes through a point spaced away along the distal direction X1 from the base portion 39 with respect to the first axial direction. In the first movable portion 40, a first movable portion space 90 is formed such that it extends back along the first axial direction, passes through the second axis L2, and communicates with the first though hole 86. The first movable portion space 90 is configured to include the aforementioned first movable portion through hole 86, and a first movable portion providing space 89 which extends from the first movable portion through hole 86 along the first axial direction up to the second axis L2. In this embodiment, the first movable portion through hole 86 extends coaxially with the first axis L1.

The second joint portion 34 is configured to include a second reduction device 87 and a second driving device 88. The second reduction device 87 is formed into a cylindrical shape, and provided in the movable portion 40, coaxially with the second axis L2. The second reduction device 87 includes a second input axis part, a second output axis part, and a second housing. The second housing is fixed to a portion, facing to the first axis L1, of the support portion 84 of the first movable portion 40. Accordingly, the second housing is located in a position spaced apart from the first axis L1 along the second axial direction. The second reduction device 87 is adapted to reduce the rotation to be applied to the second input axis part and transmit it to the second output axis part. The second output axis part is configured to be rotatable about the second axis L2 relative to the first movable portion 40.

The second driving device 88 is provided in the first support portion 84 of the first movable portion 40 such that it faces the first axis L1 and is positioned nearer to the proximal end (along the proximal direction X2) than the second reduction device 87. The second driving device 88 is configured to provide rotation to the second input axis part of the second reduction device 87 via a belt transmission mechanism, i.e., a power transmission mechanism. The second reduction device 87 can be achieved by a Cyclo-Reduction device. The second driving device 88 can be provided by employing a servomotor.

The second movable portion 41 is fixed to the second output axis part of the second reduction device 87, and is configured to be rotatable about the second axis L2 relative to the first movable portion 40. In this embodiment, the second movable portion 41 is formed into a generally L-shaped body. The second movable portion 41 includes a second fixed portion 91 fixed to the second output axis part of the second reduction device 87 and a second support portion 92 which bends from the second fixed portion 91 and at which the third axis L3 is set. The second fixed portion 91 is fixed to an end face of the second output axis part of the second reduction device 87, and extends along the third axial direction from the second output axis part. The second fixed portion 91 extends from the second output axis part in the direction perpendicular to the second axis L2 as well as in the direction to be spaced away from the second output axis part.

The second support portion 92 is connected with one end of the second fixed portion 91 opposed to the second driving device with respect to the third axial direction, and extends along the second axial direction to be far away from the second output axis part. As such, the second support portion 92 is spaced away from the second axis L2 in the third axial direction, and extends from the second fixed portion 91 along the second axial direction. At the second support portion 92, the third axis L3 described above is set.

The third axis L3 extends perpendicularly to the second axis L2, and passes through a point nearer to the first axis L1 from the movable portion 40 with respect to the second axial direction. Also, the third axis L3 passes through a point which is nearer to the first axis L1 along the second axial direction than the second output axis part of the second reduction device 87. In this embodiment, with the second movable portion 41 rotating about the second axis L2, the third axis L3 can take either one of a state in which it extends coaxially with the first axis L1 or a state in which it crosses the first axis L1. In the second support portion 92, a second movable portion through hole 93 is formed extending therethrough coaxially with the third axis L3.

In the second movable portion 41, a second movable portion space 95 is formed such that it extends along the third axial direction, passes through the second axis L2, and is in communication with the first movable portion providing space 89. The second movable portion space 95 extends from the above-described second movable portion through hole 93 coaxially therewith along the third axis L3 so as to include a second movable portion providing space 94 which extends up to the second axis L2. The second movable portion providing space 94 is in communication with the first movable portion providing space 89 passing through the second axis L2.

The third joint portion 35 is configured to include a third reduction device 96 having a hollow structure and a third driving device 97. The third reduction device 96 is formed into an annular shape, and provided in the second movable portion 41 coaxially with the third axis L3. The third reduction device 96 includes a third input axis part, a third output axis part, and a third housing. The third housing is fixed to one end portion of the second support portion 92 of the movable portion 41, opposed to the other end portion which faces the second axis L2.

The third reduction device 96 is adapted to reduce the rotation to be applied to the third input axis part and transmits it to the third output axis part. The third reduction device 96 extends coaxially with the third axis L3, and a third through hole 98 is formed in communication with the second movable portion through hole 93 of the second movable portion 41. The third output axis part is configured to be rotatable about the third axis L3 relative to the second movable portion 41.

The third driving device 97 is provided at one end of the second support portion 92 of the second movable portion 41, opposed to the second fixed portion 91 across the third axis L3. The third driving device 97 is configured to apply rotation to the third input axis part of the third reduction device 96. The third driving device 97 is positioned opposite to the third reduction device 96 across the second movable portion 41 with respect to the third axial direction, and arranged to be spaced away from the third axis L3 in the direction vertical to the third axis L3. For example, the third reduction device 96 can be achieved by a Cyclo-Reduction device having a hollow structure. The third driving device 97 can be provided by employing a servomotor.

The third movable portion 42 is fixed to the third output axis part of the third reduction device 96. In the third movable portion 42, a third movable portion space 99 is formed such that it extends coaxially with the third axis L3 and is in communication with the external space 100 from the third through hole 98. The third movable portion 42 is configured such that an end effecter can be attached thereto. In this case, the end effecter to be attached to the third movable portion 42 is constructed to be rotatable about the third axis L3, together with the third movable portion 42.

Figure 4:
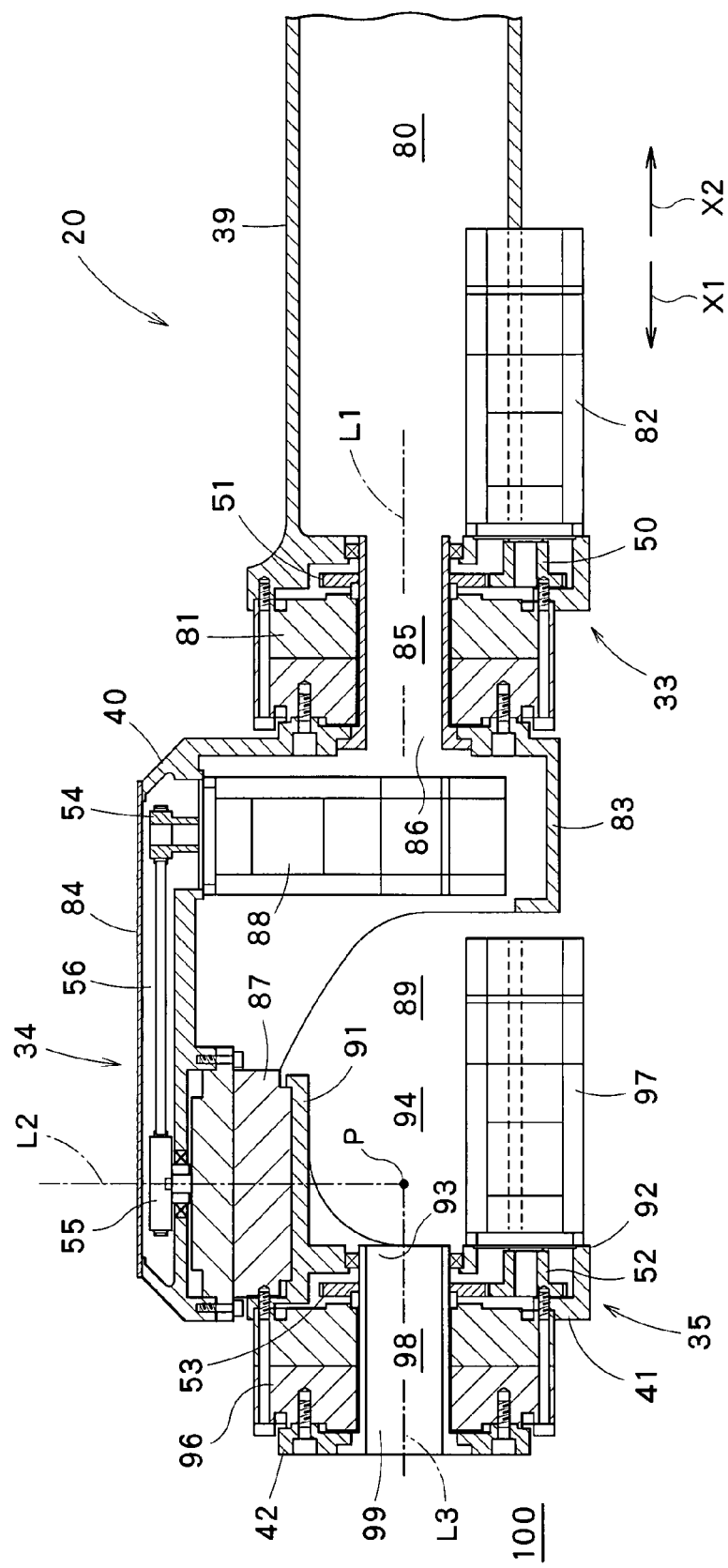
FIG. 4 is a front section showing a terminal mechanism of the industrial robot 20.
Figure 5:
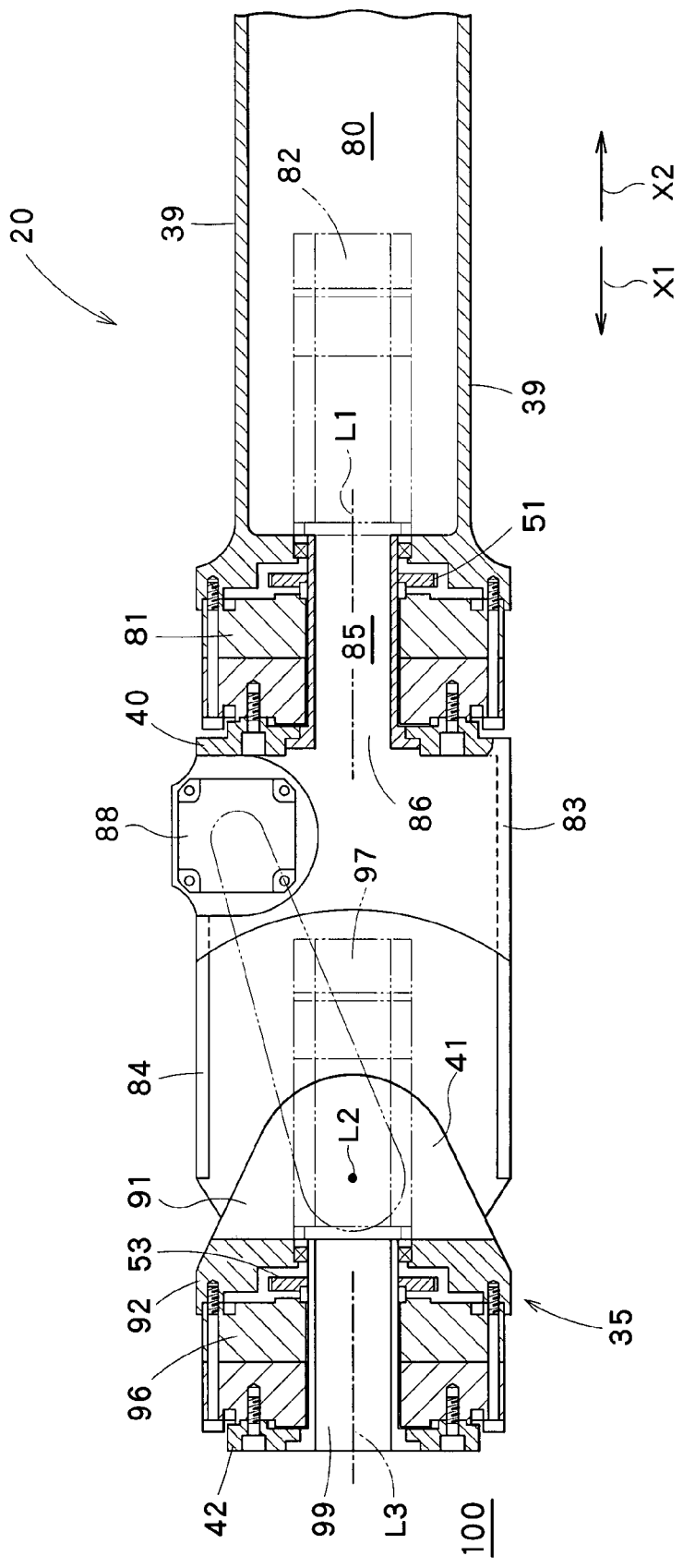
FIG. 5 is a side section showing the terminal mechanism of the industrial robot 20.

FIG. 4 is a front section showing a terminal mechanism of the industrial robot 20. FIG. 5 is a side section showing the terminal mechanism of the industrial robot 20. In this embodiment, the first driving device 82 includes a housing and an output axis part. The housing of the first driving device 82 is formed into a generally quadrangular prism, spaced away from the first axis L1 in the direction vertical to the first axis L1, extending in parallel to the first axis L1 and fixed to the base portion 39. The housing of the first driving device 82 is disposed contiguously to an outer periphery of the base portion 39. As such, the first driving device 82 can be removed from the base portion 39 with ease. A first gear 50 is coaxially fixed to the output axis part of the first driving device 82. The input axis part of the first reduction device 81 is formed into a hollow cylindrical shape, to which a hollow-shape second gear 51 is coaxially fixed. In this way, due to gear power transmission achieved by rotatably meshing the first gear 50 with the second gear 51 and by rotating the output axis part of the first driving device 82, rotation can be applied to the input axis part of the first reduction device 81.

Similarly, the third driving device 97 includes a housing and an output axis part. The housing of the third driving device 97 is formed into a generally quadrangular prism, spaced away from the third axis L3 in the direction vertical to the third axis L3, extending in parallel to the third axis L3 and fixed to the second movable portion 41. The housing of the third driving device 97 is disposed in a position spaced away from the third axis L3 along the second axial direction. In this embodiment, the distance that the third driving device 97 is spaced away from the third axis L3 is set equally to the distance that the first driving device 82 is spaced away from the first axis L1.

A third gear 52 is coaxially fixed to the output axis part of the third driving device 97. The input axis part of the third reduction device 96 is formed into a hollow cylindrical shape, to which a hollow-shape fourth gear 53 is coaxially fixed. Due to gear power transmission achieved by rotatably meshing the third gear 52 with the fourth gear 53 and by rotating the output axis part of the third driving device 97, rotation can be applied to the input axis part of the third reduction device 96. As shown in FIG. 4, the third driving device 97 is disposed in a position exposed to the outside while being fixed to the second movable portion 41. Thus, the third driving device 97 can be readily installed and removed relative to the second movable portion 41.

The second driving device 88 includes a housing and an output axis part. The housing of the second driving device 88 is formed into a generally quadrangular prism, spaced away from the second axis L2 in the direction vertical to the second axis L2, extending in parallel to the second axis L2 and fixed to the first movable portion 40. The second driving device 88 is arranged nearer to the second axis L2 than the first reduction device 81 and faces to the first reduction device 81. A first pulley 54 is coaxially fixed to the output axis part of the second driving device 88. The input axis part of the second reduction device 87 is formed into a cylindrical shape, to which a second pulley 55 is coaxially fixed. A belt 56 is wound around the first pulley 54 and second pulley 55. Due to belt power transmission to be achieved by rotating the output axis part of the second driving device 88, rotation can be applied to the input axis part of the second reduction device 87.

The second driving device 88 is arranged to be spaced away from a first plane defined by including the first axis L1 and second axis L2 along the direction vertical to the first plane. In this way, interference between the cable 22 and the second driving device 88 can be avoided. The axis of the second driving device 88 extends in parallel to the second axis L2. Additionally, the second driving device 88 is arranged to cross a second plane vertical to the second axis L2. Thus, it can be suppressed that the second driving device 88 projects beyond the base portion 39 in the second axial direction. The second driving device 88 is disposed as near as possible relative to the base portion 39. As shown in FIG. 5, the second driving device 88 is arranged in a position exposed to the outside while being fixed to the first movable portion 40. As such, the second driving device 88 can be readily installed and removed relative to the first movable portion 40. In this embodiment, the first, second and third driving devices 82, 88, 97 can be achieved by the same kind of electric motors, respectively. In addition, the first reduction device 81 and third reduction device 96 can be provided by employing the same kind of reduction devices, respectively.

As described above, in this embodiment, the respective reduction devices 81, 87, 96 are provided separately from the respective driving devices 82, 88, 97. Due to the arranging of the axes of driving devices 82, 88, 97 respectively shifted from the first to third axes L1 to L3 as well as to the fixed positions of driving devices 82, 88, 97 respectively exposed to the outside, the arranging and removal of each driving device can be performed with ease. By arranging the driving devices 82, 88, 97 to shift them from the first to third axes L1 to L3 respectively, entering of each driving device 82, 88, 97 into a space, in which the cable 22 may be curved between the first reduction device 81 and the third reduction device 96, can be avoided, thus preventing interference between the cable 22 and each driving device. By providing the respective driving devices separately from the respective reduction devices, the tendency to make the space in which the cable may be curved in the robot be reduced can be lessened or eliminated, thus preventing interference due to the cable.

Figure 6A:
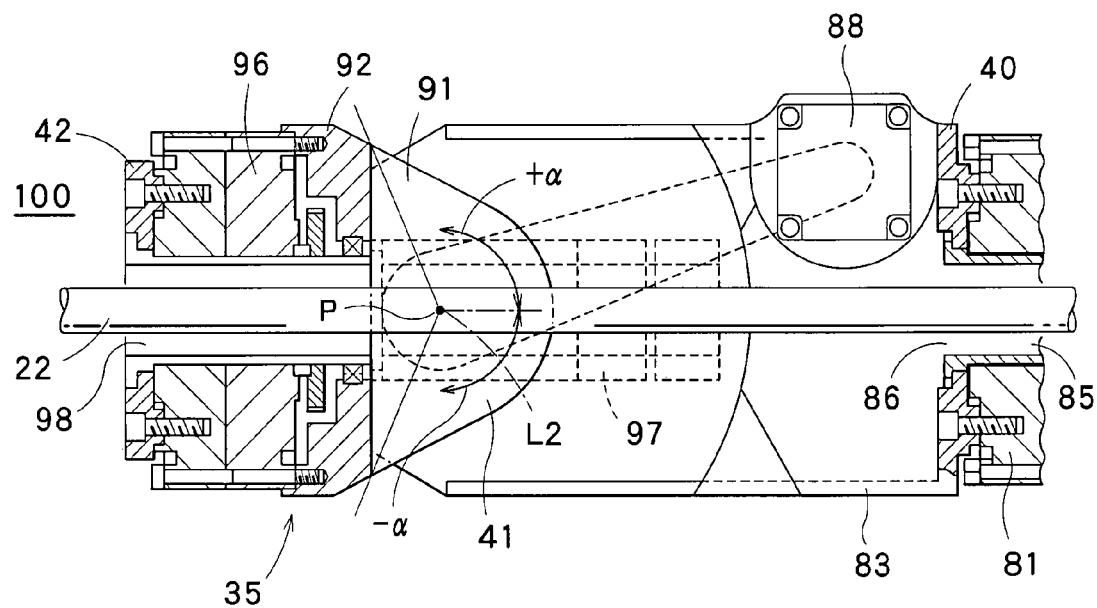
FIGS. 6A and 6B are schematic views showing a state in which a second movable portion 41 is rotated about a second axis L2.
Figure 6B:
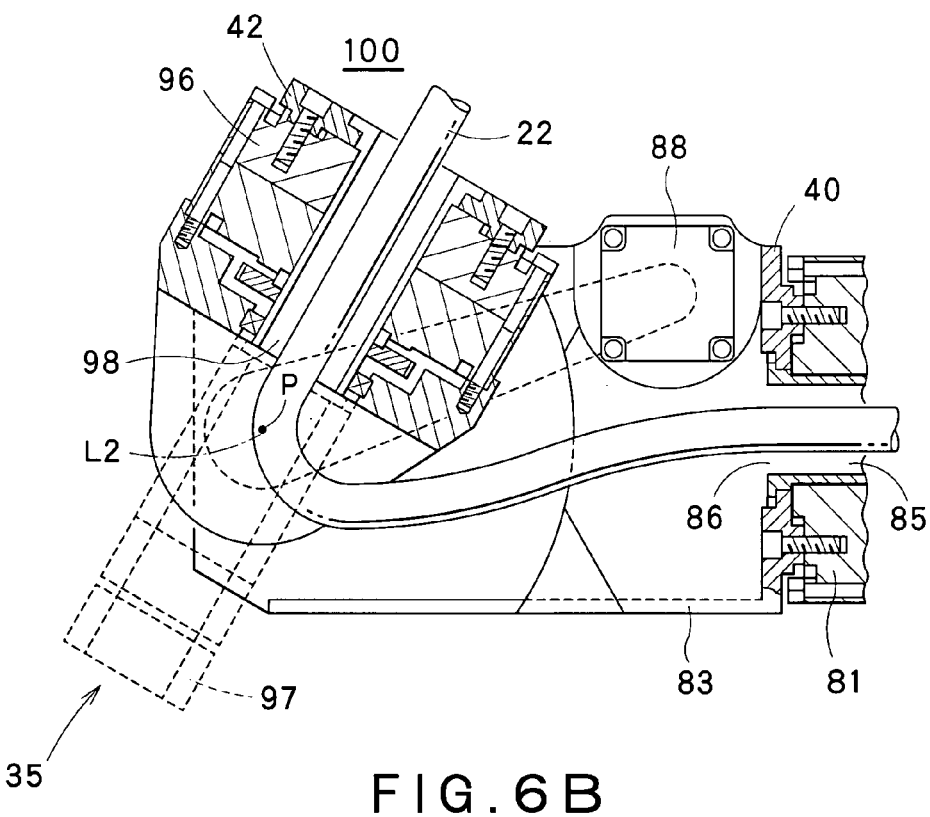

FIGS. 6A and 6B are schematic views showing a state in which a second movable portion 41 is rotated about a second axis L2. FIG. 6A shows a reference state in which the first axis L1 and the third axis L3 are coaxial, and FIG. 6B shows a state in which the second movable portion 41 is rotated about the second axis L2 from the reference state. In FIGS. 6A and 6B, a state in which the cable 22 is inserted through the robot is shown.

In this embodiment, as shown in FIG. 6A, in the reference state in which the first axis L1 and the third axis L3 are coaxial, the second movable portion 41 defines a space which is opened radially by a predetermined angle to be formed about an intersection point P of the second axis L2 and first axis L1 with respect to a plane vertical to the second axis L2. Specifically, even if a straight line to be drawn from the point P as a center is angularly displaced from an angular position in which it is coaxial with the first axis L1 about the intersection point P within a predetermined angular range, it can be prevented that the line contacts with the second movable portion 41. In this embodiment, the angular range is set at $\pm\alpha$ degrees. For example, in this embodiment, the angular range is set at ±135 degrees.

In this case, as shown in FIG. 6B, even if the second movable portion 41 is rotated about the second axis L2 within the above-described predetermined angular range, the interference between the second movable portion 41 and the cable 22 can be prevented.

As shown in FIG. 5, since the first movable portion 40 is formed such that it extends vertically to a plane including the first axis L1 and the second axis L2, at least in the vicinity of the second axis L2, and opens in the direction passing through the first axis, the interference between the cable 22 having been deformed and the second movable portion 41 can be prevented. In this embodiment, the first movable portion 40 is formed in a region from a portion near the base portion 39 to the second axis such that it extends vertically to the plane including the first axis L1 and the second axis L2 and opens in the direction passing through the first axis.

Additionally, even if the third driving device 97 is angularly displaced together with the angular displacement of second movable portion 41, an adequate space is provided such that the third driving device 97 will not interfere with the first movable portion 40 and second driving device 88. Specifically, the first movable portion 40 is formed in a region other than the movable region in which the third driving device 97 may be moved about the second axis L2. In this embodiment, since the first movable portion 40 supports the second movable portion in a cantilevered fashion via the second reduction device 87, interference between the first movable portion 40 and the third driving device 97 can be prevented.

Figure 7:
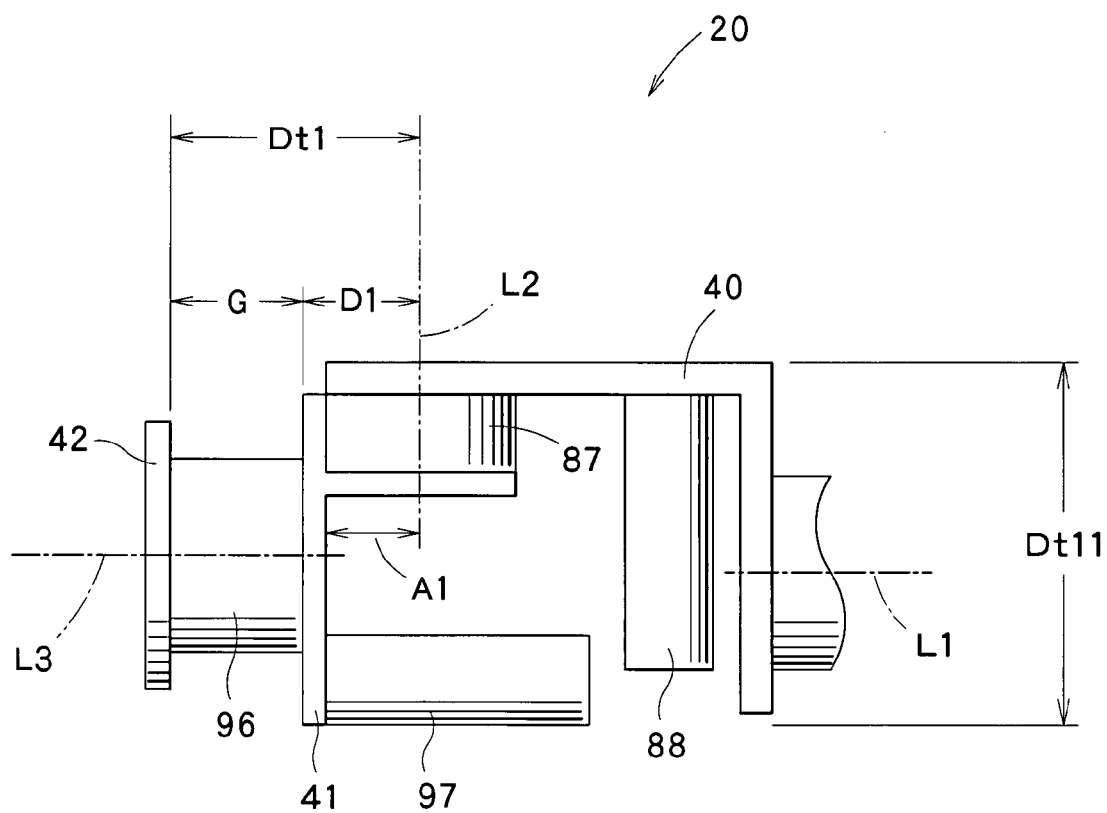
FIG. 7 is a schematic view showing a portion of the terminal mechanism of the industrial robot 20 of the first embodiment.
Figure 8B:
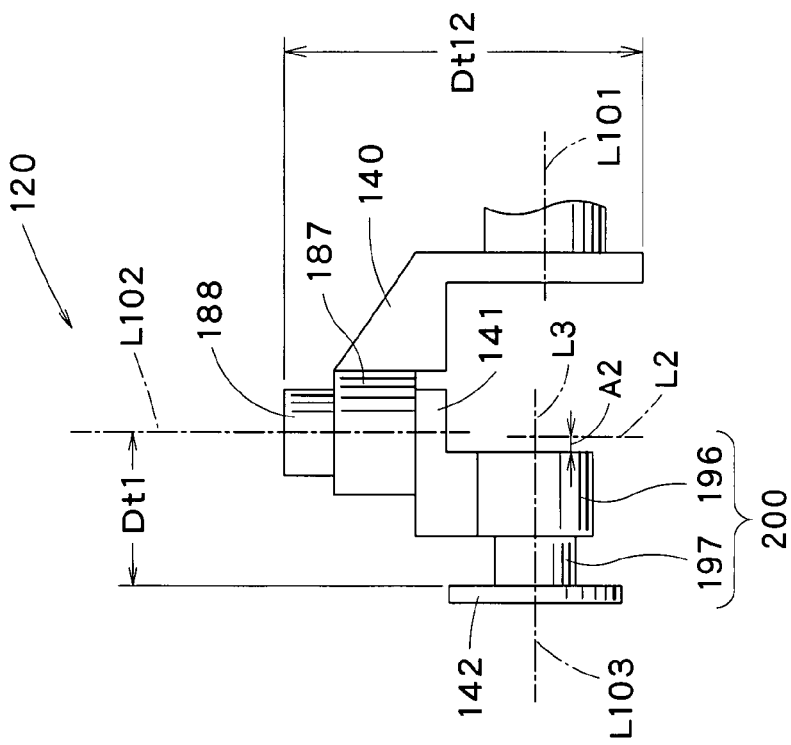
FIGS. 8A and 8B are schematic views showing portions of terminal mechanisms of industrial robots of comparative examples.
Figure 8A:
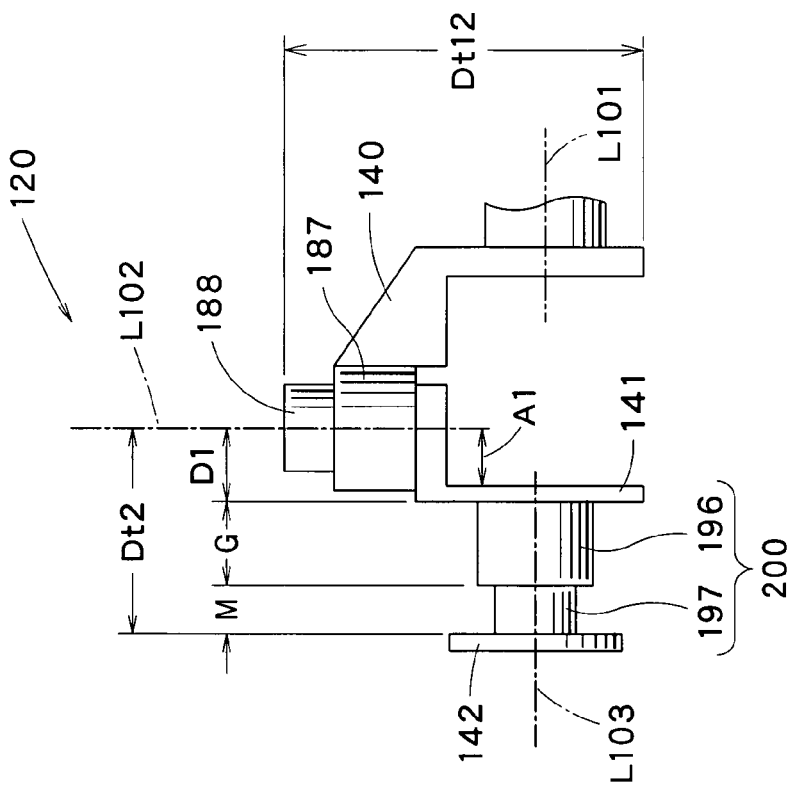

FIG. 7 is a schematic view showing a portion of the wrist mechanism of the industrial robot 20 of this embodiment. FIGS. 8A and 8B are schematic views showing portions of wrist mechanisms of industrial robots 120 of comparative examples.

The industrial robot 120 of the comparative example illustrates a case where the reduction devices and driving devices are integrally formed. In the industrial robot 120 of the comparative example, each like component corresponding to the industrial robot 20 of this embodiment is denoted by a reference numeral obtained by adding 100 to the reference numeral assigned to each corresponding component of the industrial robot 20 of this embodiment. FIG. 8A illustrates a first comparative example in a case where the distance A1 between the second axis L102 and the second movable portion 141 is relatively large, and FIG. 8B illustrates a second comparative example in a case where the distance A2 between the second axis L102 and the second movable portion 141 is relatively small.

As shown in FIG. 7, in this embodiment, the third reduction device 96 and the third driving device 97 are formed separately wherein the third driving device 97 is arranged nearer to the second axis L2 than the second movable portion 41. Accordingly, a remarked distance Dt1 defined from the second axis L2 to the third movable portion 42 is the sum of a third axial directional distance D1 defined from the second axis L2 to the near side of the third reduction device 96 and a third axial directional distance G defined by the third reduction device 96 (i.e., Dt1=D1+G1).

On the other hand, as shown in FIG. 8A, in a reduction device-integrated type motor 200, the remarked distance Dt2 becomes larger by the length defined by the incorporation of a driving device 197 to a reduction device 196. Specifically, the remarked distance Dt2 of the first comparative example is the sum of the third axial directional distance D1 defined from the second axis L2 to the near side of the third reduction device 196, the third axial directional distance G defined by the third reduction device 196, and a third axial directional distance M defined by a third driving device 142 (i.e., Dt2=D1+G+M).

As shown in FIG. 8B, when attempting to achieve the remarked distance Dt1 of this embodiment by using the reduction device-integrated type motor 200, the distance A2 between the second axis L102 and the second movable portion 141 should be significantly lessened as compared with this embodiment (A2<A1). In this case, due to such significant reduction of the distance A2 between the second axis L102 and the second movable portion 141, upon rotation of the second movable portion 141 about the second axis L2, the cable 22 may tend to interfere with the second movable portion 141 as well as with the reduction device-integrated type motor itself, thus being impractical. Therefore, in such a comparative example, the remarked distance Dt2 is larger, as shown in FIG. 8A, than the remarked distance Dt1 of this embodiment.

As described above, in this embodiment, the third axial directional dimension (G) of the third reduction device 96 can be reduced as compared with the third axial directional dimension (M+G) of the reduction device-integrated type motor 200 in which the third reduction device 96 and the third driving device 97 are integrated together. Accordingly, the remarked distance Dt1 defined from the second axis L2 to the end effecter in this embodiment can be reduced as compared to the remarked distance Dt2 defined from the second axis L2 to the end effecter in the first comparative example. Also, with respect to the dimensions Dt11, Dt12 in the second axial direction, it can be reduced in this embodiment as compared with the comparative example. Consequently, the terminal mechanism of the industrial robot of concern can be downsized in the second axial direction.

Figure 9A:
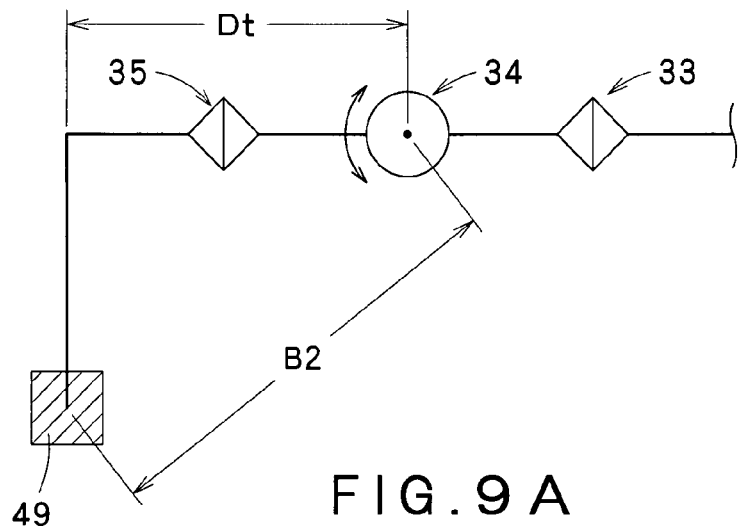
FIGS. 9A, 9B and 9C are diagrams provided for explaining torques required for driving devices 82, 88 to rotate an end effecter by a remarked distance Dt.
Figure 9B:
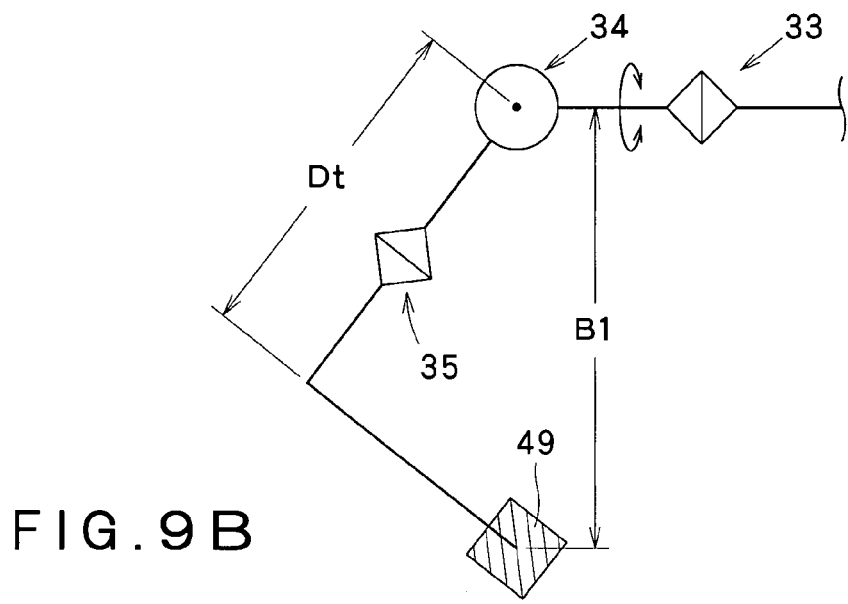
Figure 9C:
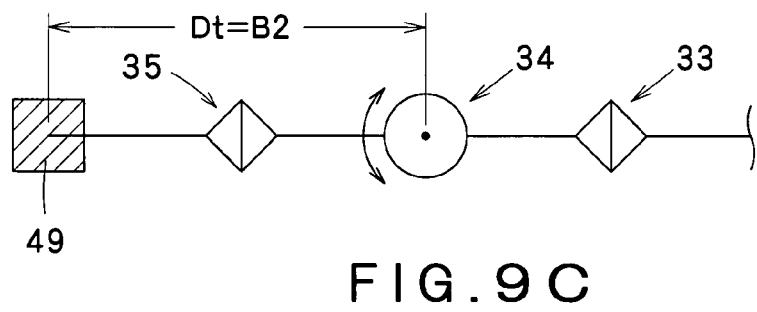

FIGS. 9A, 9B and 9C are diagrams provided for explaining torques required for the driving devices 82, 88 to rotate an end effecter by remarked distance Dt. FIG. 9A is a diagram for showing a torque required for the second driving device 88, and FIG. 9B is a diagram for showing a torque required for the first driving device 82. FIG. 9C is a diagram for illustrating a torque required for the second driving device 88 when an end effecter which is different from those shown in FIGS. 9A and 9B is provided.

As shown in FIG. 9A, due to increase of the remarked distance Dt, the distance defined from the second axis L2 to the third movable portion 42, a second rotational distance B2 defined from the second axis L2 to an end effecter 49 is increased. Contrary, if the remarked distance Dt is decreased, the second rotational distance B2 is reduced. The torque required for the second driving device 88 to rotate the end effecter 49 about the second axis L2 can be expressed by multiplying the second rotational distance B2 by the weight of end effecter 49. In this embodiment, since the remarked distance Dt can be reduced as compared with the comparative example as described above, the torque required for the second driving device 88 to rotate the end effecter 49 about the second axis L2 can be reduced.

As shown in FIG. 9B, in a state where the end effecter 49 is shifted from the first axis L1 in a direction vertical to the first axis L1, if the remarked distance Dt, the distance from the second axis L2 to the third movable portion 42 is increased, a first rotational distance B1 defined from the first axis L1 to the end effecter 49 is increased also. Contrary, if the remarked distance Dt is decreased, the first rotational distance B1 is reduced. In this case, the torque required for the first driving device 82 to rotate the end effecter 49 about the first axis L1 can be expressed by multiplying the first rotational distance B1 by the weight of end effecter 49. In this embodiment, since the remarked distance Dt can be reduced as compared with the comparative example as described above, the torque required for the first driving device 82 to rotate the end effecter 49 about the first axis L1 can be reduced.

With reference to FIG. 9C, one example for calculating the torque required for the second driving device 88 will be described. When the center of gravity of end effecter 49 is positioned on the third axis, the second rotary distance B2 coincides with the remarked distance Dt. To facilitate understanding, when assuming that in this embodiment and the first comparative example, the third axial directional distances D1 defined from the second axis L2 to the near side of the third reduction devices 96, 196 and the third axial directional distance G defined by the third reduction devices 96, 196 are equal respectively, the third axial directional dimension M of the third driving device 197 in the first comparative example can be eliminated in this embodiment.

For example, in the first comparative example, it is assumed that the remarked distance Dt is 0.37 m, and the third axial directional dimension M of the third driving device 197 is 0.1 m. In this case, the remarked distance Dt1 of this embodiment will be one obtained by subtracting the third axial directional dimension M of the third driving device 197 in the first comparative example from the remarked distance Dt2 of the first comparative example (Dt2−M). Accordingly, in this embodiment, the remarked distance Dt can be reduced by 0.1 m as compared with the first comparative example.

For example, in the case where the mass Eg of the end effector is 200 kg, the torque (Eg×Dt) required for the second driving device 88 to rotate the end effector 49 about the second axis L2 will be 725.2 Nm (=200×9.8×0.37) in the first comparative example (Eg×9.8×Dt2). On the other hand, in this embodiment, the torque to be required (Eg×9.8×Dt1) is 529.2 Nm (=200×9.8×0.27). Namely, in this embodiment, the torque required for rotating the end effector 49 can be reduced by approximately 27% as compared with the first comparative example.

In the state shown in FIG. 9C, in this embodiment, as compared with the first comparative example, the torque required for rotating the end effector 49 about the second axis L2 can be reduced by a value to be obtained by dividing the remarked distance Dt1 of this embodiment by the remarked distance Dt2 of the first comparative example (Dt1/Dt2). This is the case also for the first driving device 82. Generally, the torque required for rotating the end effector 49 about the first axis L1 or second axis L2 can be reduced by a value to be obtained by dividing the rotational distance of this embodiment by the rotational distance of the first comparative example.

As discussed above, in this embodiment, the torque required for the first and second driving devices 82, 88 to rotate the end effector 49 can be reduced, for example, by 27% as compared with the first comparative example. Consequently, as compared with the first comparative example, the electric power consumption of the first driving device 82 and second driving device 88 can be reduced. The angular acceleration and rotational speed in rotating the end effector 49 can be enhanced. In addition, by reducing the torque, the first driving device 82 and second driving device 88 with a low power torque can be employed. Furthermore, by employing a smaller motor, the production cost can be reduced as well as downsizing and lightening for the industrial robot of concern can be attempted.

As described above, in accordance with the present invention, the end effector 49 can be moved to any desired point within a movable range by rotating the first to third movable portions 40, 41, 42 in each predetermined rotational amount by using the corresponding first to third driving devices 82, 88, 97. By transmitting power of the driving devices 82, 88, 97 to the corresponding movable portions via the reduction devices 81, 87, 96, respectively, the torque which can be applied to each of the movable portions 40, 41, 42 can be increased. Adding to the terminal mechanism, by providing the respective arm joint portions 30 to 32 for displacing and driving the base portion 39, the industrial robot can be realized as an articulated six-axle robot, thereby the end effector can be arranged in any desired position and posture.

Due to the internal space 80 of the base portion 39, first movable portion space 90, second movable portion space 95, third through hole 98 and third movable portion space 99, a single cable insertion passage can be formed. The cable insertion passage can be held to be in a communicatable state therein even if the first movable portion 40, second movable portion 41 and third movable portion 42 are rotated, respectively. Accordingly, by inserting the cable 22 through the cable insertion passage and having it extend from the internal space 80 of the base portion 39 to the external space of the third movable portion 42, deformation of the cable 22 inserted through the cable insertion passage can be lessened even when the industrial robot 20 is displaced in form due to rotational displacements of the respective movable portions 40 to 42. Accordingly, phenomena such that the cable 22 is pulled greatly, subjected to buckling force and/or axially compressive force can be prevented, thus reducing the load to be imposed on the cable 22 and lengthening the life span of the cable 22.

In this embodiment, the third reduction device 96 and the third driving device 97 are formed separately. Accordingly, the third axial directional dimension of the third reduction device 96 can be reduced as compared with the structure in which the third reduction device 96 and the third driving device 97 are integrally formed. As such, interference between the third reduction device 96 and the cable 22 can be prevented, and the distance defined between the third reduction device 96 and the second axis L2 can be reduced so as to make them closer to each other. Accordingly, the distance from the second axis L2 to the end effector 49 can be reduced, so that the torque required for the first driving device 82 and second driving device 88 to rotate and drive the end effector 49 can be decreased. Therefore, even when the weight of end effector 49 is relatively large, increase of the torque required for the first driving device 82 and second driving device 88 can be properly suppressed. In addition, a higher-speed operation can be achieved as compared with the conventional industrial robot.

Since the third driving device 97 is positioned opposite to the third reduction device 96 across the second movable portion 41 with respect to the third axial direction, projection of the third driving device 97 from the third reduction device 96 in the third axial direction can be prevented, as well as interference of the third driving device 97 can be prevented when fixing the end effector 49 to the third output axis part of the third reduction device 96. In addition, since the third driving device 97 is arranged to be spaced away from the third axis L3 in the direction vertical to the third axis L3, even though the third driving device 97 is positioned opposite to the third reduction device 96 across the second movable portion 41 with respect to the third axial direction, interference of the third driving device 97 with the cable 22 can be prevented so that damage of the cable 22 can be prevented.

According to this embodiment, the first axis L1, second axis L2 and third axis L3 cross together at one point P. Thus, even when the first movable portion 40 is rotated about the first axis L1 or the third movable portion 42 is rotated about the third axis L3 from the reference state in which the first axis L1 and the third axis L3 are coaxially arranged, the length of the cable insertion passage is kept substantially constant.

When the second movable portion 41 is rotated about the second axis L2 from the reference state within a predetermined rotational range, the cable insertion passage advances linearly from the internal space 80 of the base portion 39 up to the intersection P of the first to third axes, then turns at the intersection P and advances linearly from the intersection P up to the external space 100 of the third movable portion 42. Accordingly, the length of the cable insertion passage can be maintained substantially the same. Thus, when the cable 22 is inserted through the cable insertion passage, even if the movable portions 40 to 42 are rotated, only a slight bending or twist will occur in the cable 22. Accordingly, transmission of force which may cause change of the distance to the cable 22, i.e., transmission of pulling force, compressive force or the like to the cable 22 can be prevented. Moreover, the route for the cable 22 can be reduced as much as possible, thus lowering the production cost.

In this embodiment, the third driving device 97 is arranged to be spaced away-from the third axis 3 in the second axial direction. Accordingly, even when the second movable portion 41 is rotated about the second axis L2, crossing between the third driving device 97 and the third axis L3 can be prevented. Consequently, even when the cable 22 is inserted through the second movable portion space 95, interference between the cable 22 and the third driving device 97 can be prevented more securely.

The second reduction device 87 and the third driving device 97 are arranged side by side along the second axial direction across the third axis L3. Thus, lack of balance of the center of gravity of the industrial robot 20 can be prevented, and undesirable increase of the torque output to be required for the first driving device 82 and second driving device 88 can be prevented as compared with a case where the center of gravity is significantly unbalanced.

The second driving device 88 extends in parallel to the second axis L2 while being spaced away from the first axis L1 in the second axial direction.

Thus, interference between the third driving device 97 arranged nearer to the end effecter and the second driving device 88 can be prevented. Additionally, since the second driving device 88 is arranged to be spaced away from the first axis L1 in the second axial direction, interference of the second driving device 88 with the cable 22 can also be prevented. Moreover, since the interference with the cable 22 can be prevented, the second driving device 88 can be arranged to cross a point in the vicinity of the first axis L1. As such, even if the second driving device 88 is arranged in parallel to the second axis L2, projection of the second driving device 88 from the second movable portion 41 in the second axial direction can be suppressed. In addition, due to such arrangement parallel to the second axis L2, the power transmission mechanism can be achieved by using a simple mechanism, such as a belt driving mechanism, idler gear mechanism or the like.

Figure 10:
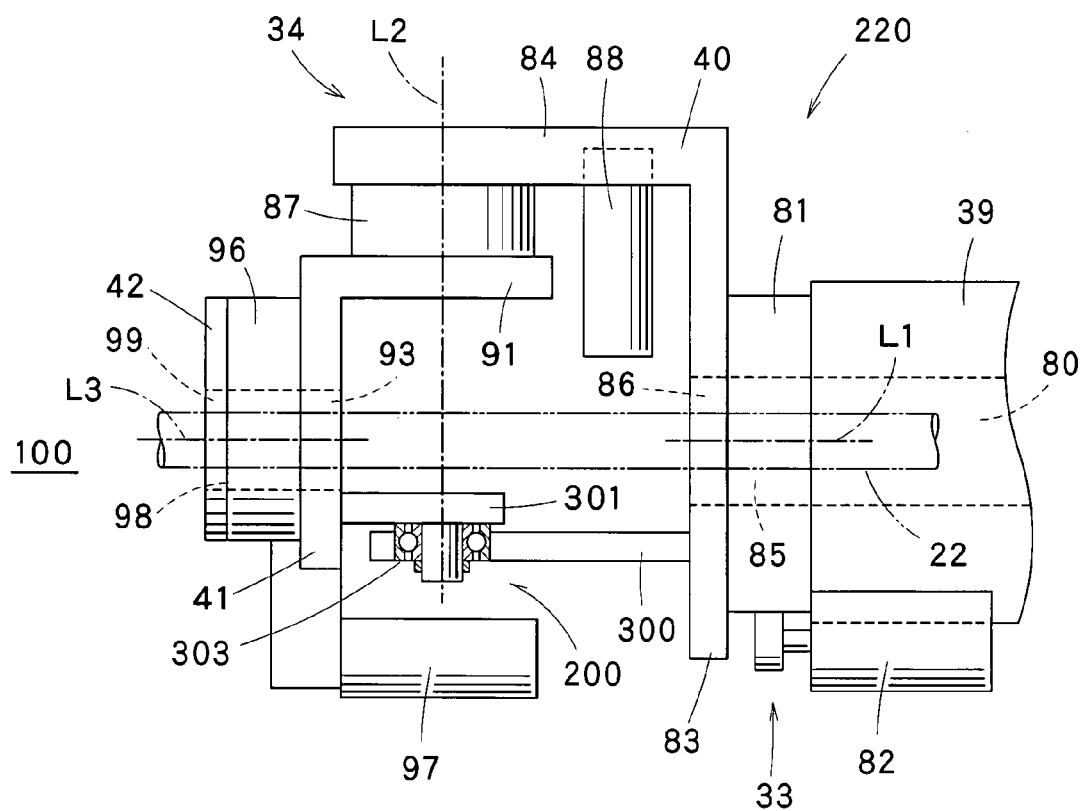
FIG. 10 is a front view schematically illustrating a portion of an industrial robot 220 of a second embodiment of the present invention.

FIG. 10 is a front view schematically illustrating a portion of an industrial robot 220 of a second embodiment of the present invention. The industrial robot 220 of the second embodiment of this invention has a similar construction to the industrial robot 20 of the first embodiment. Thus, descriptions for like parts or constructions will be omitted, and like reference numerals are designated thereto, respectively.

In the industrial robot 220 of the second embodiment, as compared with the industrial robot 20 of the first embodiment, the first movable portion 40 supports the second movable portion 41 indirectly in an inboard manner. In other words, the second movable portion 41 is supported by the first movable portion 40 such that both of its one end in the second axial direction and the other end in the same are supported by the first movable portion 40. Other parts of the constitution of the second embodiment are similar to those of the first embodiment.

Specifically, the movable portion 40 is formed into a generally C-shaped body. The first movable portion 40 includes a first fixed portion 83 fixed to the first output axis part of the first reduction device 81, a first support portion 84 which bends from the first fixed portion 83 and at which the second axis L2 is set, and a first rotational support portion 300.

The first fixed portion 83 is fixed to an end face of the first output axis part of the first reduction device 81, and extends along the second axial direction from the first output axis part. The first support portion 84 is fixed to one end of the first fixed portion 83 with respect to the second axial direction. The first rotational support portion 300 is fixed to the other end of the first fixed portion 83 with respect to the second axial direction. The first rotational support portion 300 is connected with the other end of the first fixed portion 83 and extends along the first axial direction. Accordingly, the first rotational support portion 300 extends in parallel to the first support portion 84, and is spaced away from the first axis L1 in the second axial direction, and then extends from the first fixed portion 83 in the first axial direction. The second axis L2 passes through the rotational support portion 300.

The second movable portion 41 is formed into a generally C-shaped body. The second movable portion 41 includes a second fixed portion 91 fixed to the second output axis part of the second reduction device 87, a second support portion 92 which bends from the second fixed portion 91 and at which the third axis L3 is set, and a second rotational support portion 301 which bends from the second support portion 92 and extends along the third axis. The second rotational support portion 301 is arranged to be spaced away from the third axis in the second axial direction.

The first rotational support portion 300 and second rotational support portion 301 are rotatably connected with each other via a bearing 303. The bearing 303 extends coaxially with the second axis L2. Accordingly, due to the bearing 303, the first rotational support portion 300 and the second rotational support portion 301 are supported to rotate about the second axis L2. Thus, the second movable portion 41 is supported at its both ends along the second axial direction, thereby enhancing rigidity as compared with the case of the cantilevered support. The third driving device 97 is arranged to be farther from the third axis in the second axial direction than the first rotational support portion 300 and second rotational support portion 301. Thus, interference between the third driving device 97 and the first rotational support portion 300 can be prevented.

Figure 11:
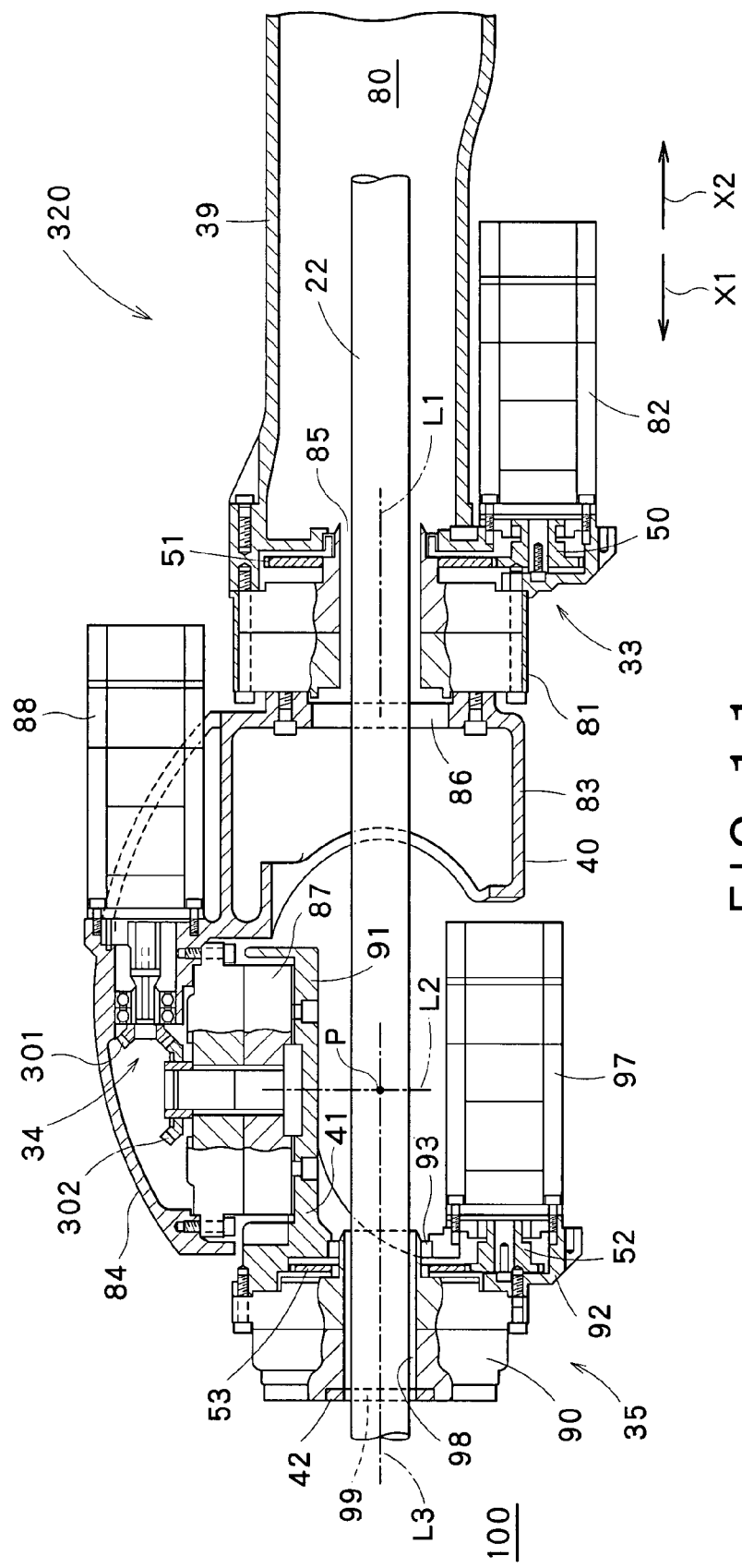
FIG. 11 is a front section of a terminal mechanism of an industrial robot 320 of a third embodiment of the present invention.
Figure 12:
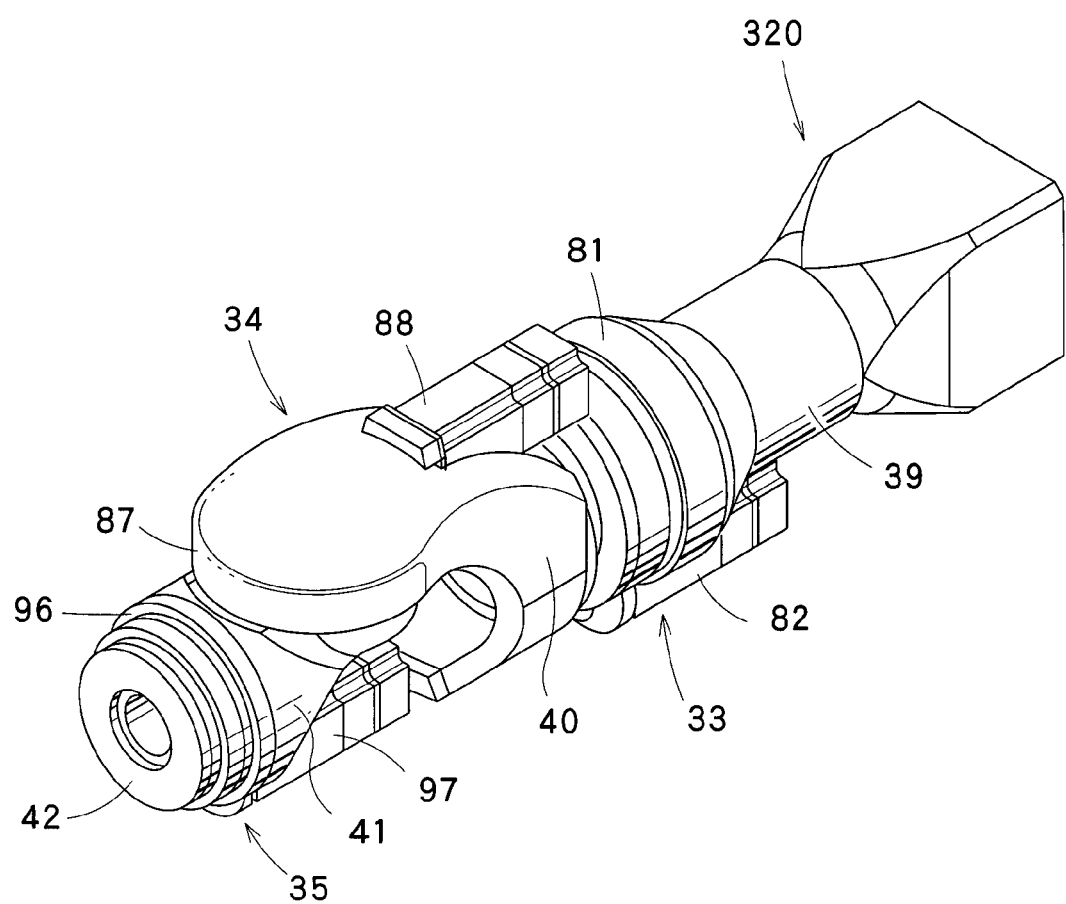
FIG. 12 is a perspective view showing the industrial robot 320.

FIG. 11 is a front section showing a terminal mechanism of an industrial robot 320 of a third embodiment of the present invention. FIG. 12 is a perspective view showing the industrial robot 320. FIG. 11 shows a state in which the cable 22 is inserted through the robot 320. The industrial robot 320 of the third embodiment of this invention has a similar construction to the industrial robot 20 of the first embodiment. Thus, descriptions for like parts or constructions will be omitted, and like reference numerals are designated thereto, respectively.

In the industrial robot 320 of the third embodiment, as compared with the industrial robot 20 of the first embodiment, the housing of the second driving device 88 extends in parallel with the first axis L1 and is fixed to the first movable portion 40. The other construction is substantially the same as that of the first embodiment. The first to third driving devices 82, 88, 97 can be achieved by the same motor, and the first to third reduction devices 81, 87, 96 can also be achieved by employing the same reduction device. In this embodiment, as with the first embodiment, the reduction device can be achieved by a Cyclo-Reduction device having a hollow shape.

The second driving device 88 includes a housing and an output axis part. The housing of the second driving device 88 is formed into a generally quadrangular prism tubular shape, spaced away from the first axis L1 in the direction vertical to the first axis L1, and extends in parallel with the first axis L1 and is fixed to the base portion 39. The housing of the second driving device 88 is arranged to be exposed to the outer periphery of the base portion 39. Thus, the second driving device 88 can be removed from the first movable portion 40 with ease. The second driving device 88 is positioned nearer to the proximal end along the proximal direction X2 than the input axis part of the second reduction device 87.

The output axis part of the second driving device 88 is located in a position adjacent to the second axis L1, to which a first bevel gear 301 is coaxially fixed. Also, to the input axis part of the second reduction device 87, a second bevel gear 302 is coaxially fixed. The first bevel gear 301 and the second bevel gear 302 are roratably meshed together. In this way, when the second driving device 88 rotates its output axis part, a rotation can be applied to the input axis part of the second reduction device 87 by gear power transmission. Due to such gear power transmission, the error of power transmission can be suppressed more accurately than the case of belt power transmission.

If it is possible to transmit power in a state where the angle formed by the output axis part of the second driving device 88 and the input axis part of the second reduction device 87 is 90 degrees, the power may be transmitted from the second driving device 88 to the second reduction device 87 by using another power transmission mechanism than the pair of bevel gears. For example, helical gears, worm gears, face gears and hypoid gears may be used, or otherwise the belt power transmission may be employed.

The second driving device 88 is arranged to be farther from the first axis L1 in the direction vertical to the first axis L1 than the first movable portion 40. Thus, even if the bundle of the cable 22 to be inserted through the robot 320 becomes relatively thick, interference of the cable 22 with the second driving device 88 can be prevented, such as by enlarging the first through hole 85 of the first reduction device 81. In other words, as compared with the case of the first embodiment in which the second driving device 88 is arranged in a space nearer to the first axis than the first movable portion 40, the space nearer to the first axis than the movable portion 40 can be further enlarged. Thus, a greater amount of cable 22 can be inserted through the robot, as well as, interference of the cable 22 with the second driving device 88 between the first reduction device 81 and the third reduction device 96 can be prevented, thereby gently bending the cable 22.

Additionally, interference between the second driving device 88 and the third driving device 97 can also be prevented. Thus, as with the first embodiment, the third reduction device 97 can be arranged without considering interference between the second driving device 88 and the third driving device 97, thereby enhancing the degree of freedom in design. Consequently, downsizing of, for example, the terminal mechanism of the industrial robot can be achieved.

In this embodiment, the base portion 39 is formed in a cylindrical shape. The second driving device 88 is arranged to be spaced away from the first axis by a distance greater than the radial dimension of the base portion 39. The base portion 39 and the second driving device 88 are partly overlapped in the direction vertical to the first axis. Also, in this case, even when the second driving device 88 is rotated together with the first movable portion 40 about the first axis L1, interference between the base portion 39 and the second driving device 88 can be prevented, and the second driving device 88 can be located in a position as near as possible relative to the proximal end along the proximal direction X2.

The first driving device 82 is located in a position nearer to the proximal end along the proximal direction X2 than the input axis part of the first reduction device 81. In this embodiment, the housing of the first driving device 82 is fixed while being exposed from the outer periphery of the base portion 39, and extends in parallel with the first axis L1. The end portion along the proximal direction X2 of the second driving device 82 is spaced away, with respect to the first axial direction, along the distal direction X1, from the end portion along the distal direction X1 of the first driving device 81, and from a gear box portion for rotatably supporting the first gear 50 formed in the base portion 39. As such, the second driving device 88 is located in a position which can avoid interference with the first driving device 82.

The second reduction device 87 is placed so as to be spaced away from the first axis L1 by a distance equal to the distance from the first axis L1 to the outer peripheral surface of the base portion 39. The second reduction device 87 forms a space through which the cable passes, and at least a portion of the second reduction device 87 extends nearer to the first axis L1 than the outer periphery of the base portion 39 in the direction vertical to the first axis L1. The third reduction device 96 is coaxial with the first reduction device 81 in the reference state where the first axis L1 and the third axis L3 are coaxial with each other. The third reduction device 96 is disposed to be as near as possible relative to the second axis L2 while being prevented from interfering with the second reduction device 87. Accordingly, in this embodiment, one end of the third reduction device 96 nearer to the proximal end X2 along the third axial direction is positioned near and opposed to the outer periphery around the second axis L2 of the second reduction device 87. Thus, the terminal mechanism can be downsized. The third driving device 97 forms a space through which the cable 22 passes in the reference state where the first axis L1 and the third axis L3 are coaxial with each other, and at least a portion of the third driving device 97 extends nearer to the first axis L1 than the outer periphery of the base portion 39 in the direction vertical to the first axis L1. Also in this way, the terminal mechanism can be downsized.

The first driving device 82 is fixed while being exposed from the outer periphery of the base portion 39. The second driving device 88 is fixed while being exposed from the outer periphery of the first movable portion 40 along the first axial direction. The third driving device 97 is fixed while being exposed from the outer periphery of the second movable portion 41 along the first axial direction and opposed to the second reduction device 87. In this way, by exposing each driving device 82, 88, 97 from a portion to which the driving device is fixed, the attachment and removal of each driving device relative to the fixing portion can be facilitated.

Figure 13A:
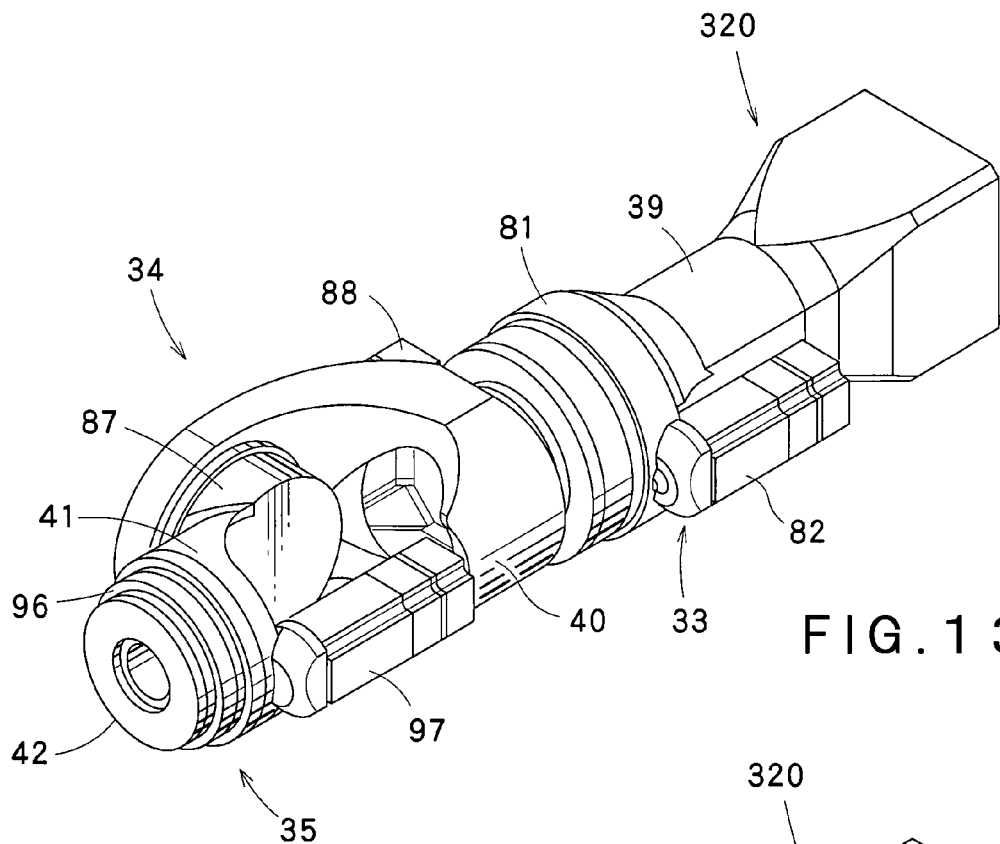
FIGS. 13A and 13B are perspective views showing the industrial robot 320 seen from different angles than that of FIG. 12.
Figure 13B:
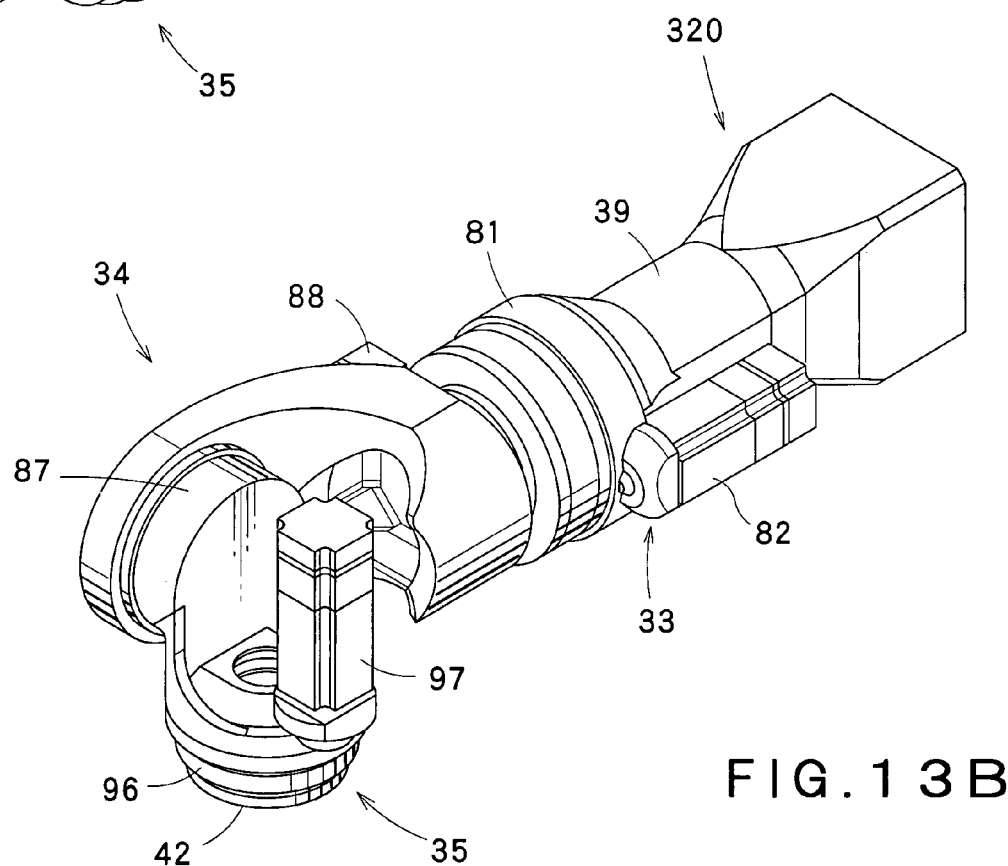

FIGS. 13A and 13B are perspective views of the industrial robot 320 seen from different angles than that of FIG. 12. FIG. 13A shows a reference state where the first axis L1 and the third axis L3 are coaxial. FIG. 13B show a state in which the second movable portion 41 is rotated by 90 degrees about the second axis L2 and the third axis L3 is inclined by 90 degrees relative to the first axis L1, as compared with the reference state. In this way, also in the industrial robot 320 of the third embodiment, the first to third movable portions 40, 41, 42 can be rotated about the corresponding axes L1 to L3 due to the first to third driving devices 82, 88, 97, respectively.

Figure 14A:
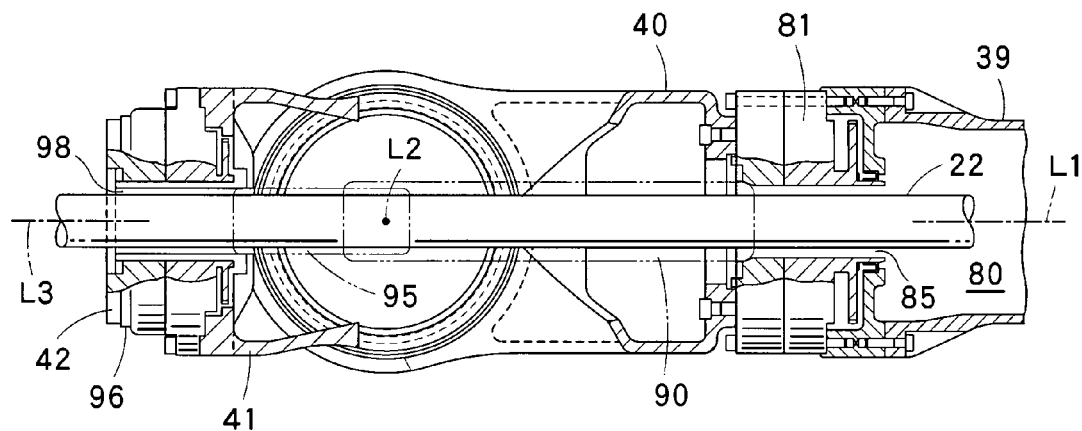
FIGS. 14A and 14B are side sections showing the terminal mechanism of the industrial robot 320 which are partially omitted.
Figure 14B:
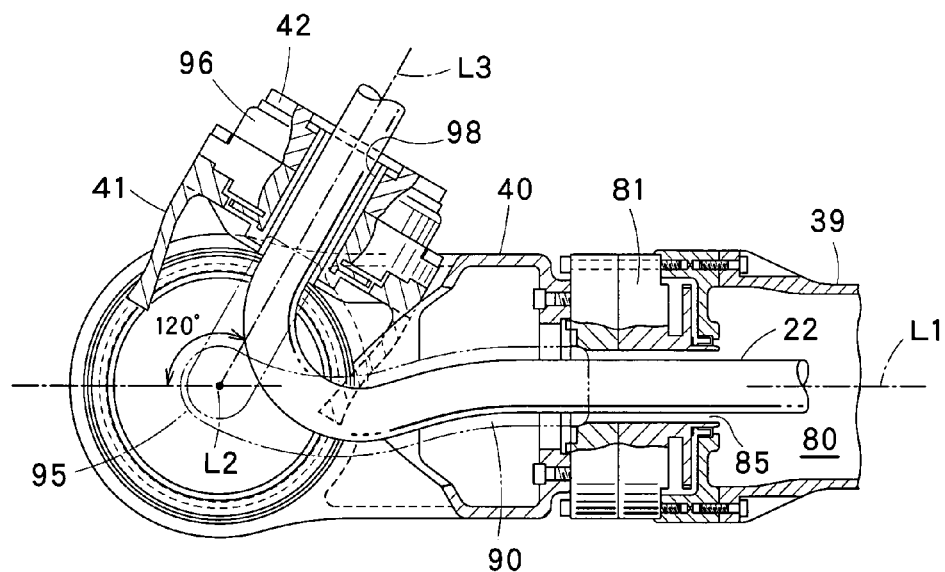
Figure 15:
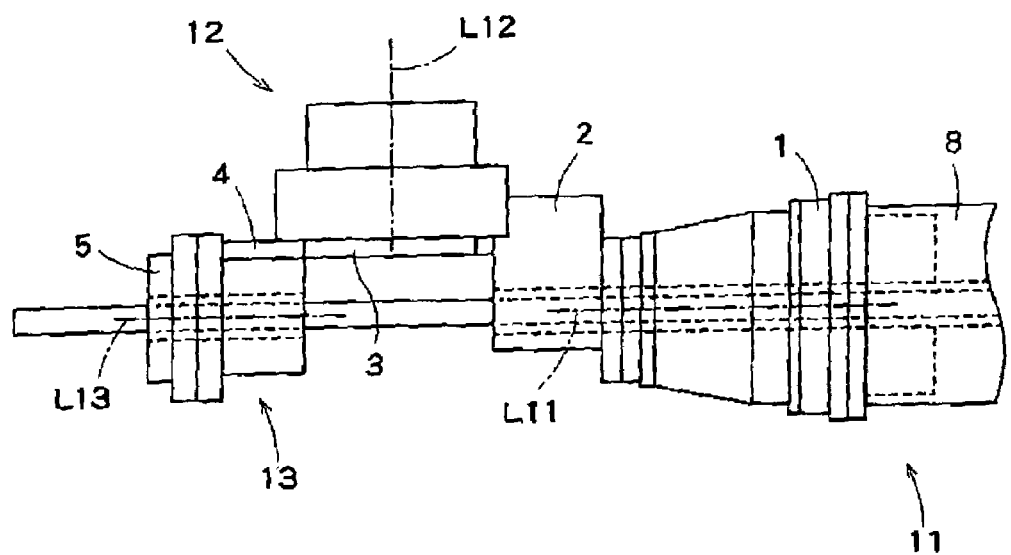
FIG. 15 is a schematic view showing an industrial robot as a related art.

FIGS. 14A and 14B are side sections showing the terminal mechanism of the industrial robot 320 which is partially omitted. FIG. 14A shows a reference state where the first axis L1 and the third axis L3 are coaxial. FIG. 14B shows a state in which the second movable portion 41 is rotated by 120 degrees about the second axis L2 and the third axis L3 is inclined by 120 degrees relative to the first axis L1, as compared with the reference state.

As discussed above, in the first movable portion 40, the first movable portion space 90 which extends along the first axial direction, passes through the second axis L2 and is in communication with the first through hole 85 is formed. In the second movable portion 41, the second movable portion space 95 extending along the third axial direction is formed in communication with the first movable portion space 90 passing through the second axis L2. Accordingly, the first movable portion space 90 and the second movable portion space 95 are in communication with each other in the vicinity of the second axis.

Since the second movable portion 42 is rotated about the second axis L2, even when the second movable portion 42 is rotated, the communication of the passing region through the second axis L2 in the first movable portion space 90 and the second movable portion space 95 can be maintained. Accordingly, even when the second movable portion 42 is rotated about the second axis L2 in a movable range, the cable 22 passing through the first through hole 85 of the first reduction device 81 and extending up to the third through hole 98 of the third reduction device 96 is curved only in a region near the second axis, thus preventing the cable 22 from being curved significantly.

The industrial robot 320 of the third embodiment as described above can provide a similar effect as in the first embodiment. Namely, as compared with the first comparative example shown in FIG. 8A, the dimension in the third axial direction from the second axis L2 to the third movable portion 41 can be significantly reduced. Consequently, the torque required for the first and second driving devices 82, 88 to rotate the end effecter 49 can be reduced as compared with the first comparative example. Thus, as compared with the first comparative example, the electric power consumption of the first driving device 82 and second driving device 88 can be reduced, and the angular acceleration and rotational speed in rotating the end effecter 49 can be enhanced.

The construction, except for arranging the second driving device 88 vertically to the first axis L1, is the same as the industrial robot 20 of the first embodiment. It should be appreciated that the construction shown in the third embodiment, except for arranging the second driving device 88 vertically to the first axis L1, may also be applied to the industrial robot 20 of the first embodiment. Additionally, the industrial robot 320 of the third embodiment may also be constructed such that the second movable portion 41 is supported in an inboard fashion by the first movable portion 40 as is seen in the second embodiment.

Each of the above embodiments of the present invention is described only by way of example and modifications and alterations can be made within a scope and spirit of the present invention. While the industrial robot described in each embodiment is for performing resistance spot welding, the present invention is not limited to this aspect. For example, rather than welding machines, the present invention can be applied to the whole industrial robots in which a cable is connected with an end effecter, including handling machines, coating machines, arc welding machines, trimming machines or sealing machines, press-to-press transferring machines, car-body transferring machines, and positioning machines. While the cable is a bundle of wirings and pipes for supplying welding electric current, power for driving a gun, cooling water, operating signals and the like, any other suitable linear materials may be included as long as they have linear bodies each capable of being connected with an end effecter and having flexibility. The industrial robot is not limited to an articulated six-axle robot, but other articulated robots having seven or more axes or those having five or less axes may be applied. While the object to be moved is an end effecter, any other objects to be moved than the end effecter may be used.

While each reduction device 82, 87, 96 has been described as a Cyclo-Reduction device, the reduction device is not limited to this type. Other than the Cyclo-Reduction device, a Harmonic Drive reduction device which is a wave-gear type reduction device, and a Rotor Vector (RV) reduction device may be used. Otherwise, the reduction device may be constructed by employing a first hypoid gear and a second hypoid gear to be meshed with the first hypoid gear. In this way, the reduction device may be constructed with a pair of gears or the like means. Accordingly, each of the first reduction device 82 and third reduction device 96 may be one having a hollow structure, and the second reduction device 87 need not have a hollow structure. Namely, each of the reduction devices 82, 87, 96 is not limited in types and shapes.

In the present invention, each of the reduction devices and driving devices can use a general-purpose reduction device or driving device. While in each embodiment the same motor has been employed for each driving device, different type motors may be used, respectively. While the same type reduction devices have been used as the first reduction device 82 and the third reduction device 96, different type reduction devices may also be used.

While the first movable portion space 90 and the second movable portion space 95 have been described to be coaxial, these spaces may be non-coaxial. The first axis L1 and the third axis L3 need not be located in the same plane. The base portion 39 need not be formed into a cylindrical shape as long as the internal space through which the cable can be inserted is formed therein.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. An industrial robot, comprising:
(a) a base portion at which a predetermined first axis is set and in which an internal space is formed so that a cable can be inserted into the internal space;
(b) a first reduction device having a hollow structure and mounted on the base portion, the first reduction device including a first input axis part and a first output axis part so that a rotation applied to the first input axis part is reduced and transmitted to the first output axis part, the first output axis part being configured to be rotatable about the first axis, and a first through hole being formed in the first reduction device so as to extend coaxially with the first axis and communicate with the internal space of the base portion;
(c) a first driving device mounted on the base portion and adapted to apply a rotation to the first input axis part of the first reduction device;
(d) a first movable portion fixed to the first output axis part of the first reduction device, a second axis being set at the first movable portion such that the second axis extends vertically to the first axis in a position spaced away from the base portion in the first axial direction, the first movable portion forming a first movable portion space to extend back along the first axial direction, pass through the second axis, and communicate with the first through hole;
(e) a second reduction device mounted on the first movable portion, the second reduction device including a second input axis part and a second output axis part so that a rotation applied to the second input axis part is reduced and transmitted to the second output axis part, the second output axis part being located in a position spaced away from the first axis in the second axial direction and configured to be rotatable about the second axis;

(f) a second driving device mounted on the first movable portion and adapted to apply a rotation to the second input axis part of the second reduction device;

(g) a second movable portion fixed to the second output axis part of the second reduction device, a third axis being set so as to pass through a position nearer to the first axis than the second output axis part of the second reduction device in the second axial direction and extend vertically to the second axis, the second movable portion forming a second movable portion space to communicate with the first movable portion space passing through the second axis and extend along the third axial direction;

(h) a third reduction device having a hollow structure and mounted on the second movable portion, the third reduction device including a third input axis part and a third output axis part so that a rotation applied to the third input axis part is reduced and transmitted to the third output axis part, the third output axis part being configured to be rotatable about the third axis, a third through hole being formed in the third reduction device so as to extend coaxially with the third axis and communicate with the second movable portion space;

(i) a third movable portion fixed to the third output axis part of the third reduction device, the third movable portion being configured such that an end effecter can be attached thereto, the third movable portion forming a third movable portion space to extend coaxially with the third axis and communicate with an external space from the third through hole; and (j) a third driving device mounted on the second movable portion and adapted to apply a rotation to the third input axis part of the third reduction device, the third driving device being located opposite to the third reduction device relative to the second movable portion with respect to the third axial direction and disposed to be spaced away from the third axis in the direction vertical to the third axis, wherein the third driving device is disposed to be spaced away from the third axis in the second axial direction, and wherein the second reduction device and the third driving device are arranged side by side across the third axis along the second axial direction.

2. The industrial robot according to claim 1, wherein the first axis, the second axis and the third axis cross one another at a single point.

3. The industrial robot according to claim 1, wherein the second driving device is arranged nearer to the base portion than the second reduction device so as to apply a rotation to the second input axis part of the second reduction device through a power transmission mechanism adapted to transmit a power; and wherein the second driving device extends in parallel with the second axis and is disposed to be spaced away from the first axis in the second axial direction.

4. The industrial robot according to claim 1, wherein the second driving device extends in parallel with the first axis and is disposed to be farther from the first axis in a direction vertical to the first axis than the first movable portion.

5. The industrial robot according to claim 1, wherein the second movable portion has a first end in the second axial direction and a second end in the second axial direction both of which are supported by the first movable portion.

6. The industrial robot according to claim 1, wherein the base portion is configured to be movable to a given three dimensional position.

* * * * *